United States Patent
Sangappa et al.

(10) Patent No.: US 8,401,250 B2
(45) Date of Patent: Mar. 19, 2013

(54) DETECTING OBJECTS OF INTEREST IN STILL IMAGES

(75) Inventors: Hemanth Kumar Sangappa, Bangalore (IN); Suresh Kirthi Kumaraswamy, Bangalore (IN); Puneeth B Chandrashekhar, Bangalore (IN)

(73) Assignee: MindTree Limited, Bangalore (IN)

( * ) Notice: Subject to any disclaimer, the term of this patent is extended or adjusted under 35 U.S.C. 154(b) by 432 days.

(21) Appl. No.: 12/753,914

(22) Filed: Apr. 5, 2010

(65) Prior Publication Data

US 2011/0243431 A1  Oct. 6, 2011

(30) Foreign Application Priority Data

Feb. 19, 2010  (IN) .............................. 428/CHE/2010

(51) Int. Cl.
*G06K 9/00* (2006.01)
*G06K 9/62* (2006.01)
*G06K 9/66* (2006.01)

(52) U.S. Cl. .......................... 382/118; 382/159; 382/195

(58) Field of Classification Search .................. 382/118, 382/159, 195
See application file for complete search history.

(56) References Cited

U.S. PATENT DOCUMENTS

| | | | |
|---|---|---|---|
| 5,835,616 A | 11/1998 | Lobo et al. | |
| 6,332,033 B1 | 12/2001 | Qian | |
| 6,421,463 B1 | 7/2002 | Poggio et al. | |
| 6,826,300 B2 | 11/2004 | Liu et al. | |
| 7,050,607 B2 | 5/2006 | Li et al. | |
| 7,099,510 B2 | 8/2006 | Jones et al. | |
| 7,142,697 B2 | 11/2006 | Huang et al. | |
| 7,162,076 B2 | 1/2007 | Liu | |
| 7,590,267 B2* | 9/2009 | Xiao et al. | 382/118 |
| 7,844,085 B2* | 11/2010 | Lu et al. | 382/118 |
| 7,860,280 B2* | 12/2010 | Danowitz | 382/118 |
| 8,023,701 B2* | 9/2011 | Hu | 382/118 |
| 2004/0247183 A1 | 12/2004 | Molander | |
| 2006/0126938 A1* | 6/2006 | Lee et al. | 382/190 |
| 2007/0053585 A1* | 3/2007 | Xiao et al. | 382/159 |
| 2007/0286490 A1* | 12/2007 | Danowitz | 382/195 |
| 2008/0008362 A1* | 1/2008 | Hu | 382/118 |
| 2008/0219558 A1* | 9/2008 | Lu et al. | 382/190 |
| 2008/0304714 A1* | 12/2008 | Lu et al. | 382/118 |
| 2009/0196506 A1* | 8/2009 | Yang et al. | 382/195 |

(Continued)

OTHER PUBLICATIONS

"Detecting Faces in Images: A Survey", Ming-Hsuan Yang, David J. Kriegman and Narendra Ahuja, 2002.

(Continued)

*Primary Examiner* — Aaron W Carter
(74) *Attorney, Agent, or Firm* — Ash Tankha; Lipton, Weinberger & Husick

(57) ABSTRACT

A computer implemented method and system for detecting interest sections in a still image are provided. One or more sub images of the still image is subjected to segmentation. A gray scale version of interest sub images and/or a binary image version of the interest sub images are matched with a predefined template for filtering the interest sub images. Multiple prospective image sections comprising one or more of prospective interest sections and prospective near interest sections are determined by performing discriminative feature analyses of the filtered interest sub images using a gabor feature filter. The discriminative feature analyses are processed by a boosted cascade of classifiers. The boosted cascade of classifiers detects the interest sections in the still image from the prospective interest sections and the prospective near interest sections. The detected interest sections are subjected to a support vector machine classifier for further detecting interest sections.

25 Claims, 23 Drawing Sheets

U.S. PATENT DOCUMENTS

2010/0329517 A1* 12/2010 Zhang et al. .................. 382/118
2011/0243431 A1* 10/2011 Sangappa et al. ............. 382/164

OTHER PUBLICATIONS

"A Bayesian Discriminating Features Method for Face Detection", Chengjun Liu, 2003.

"Neural-Network Based Face-Detection", H. Rowley, S. Baluja and T. Kanade, 1998.

"A Trainable System for Object Detection", Constantine Papageorgiou and Tomaso Poggio, 2000.

Image Representation Using 2D Gabor Wavelets, Tai Sing Lee, 1996.

* cited by examiner

TILTED IMAGE

TILT CORRECTED IMAGE

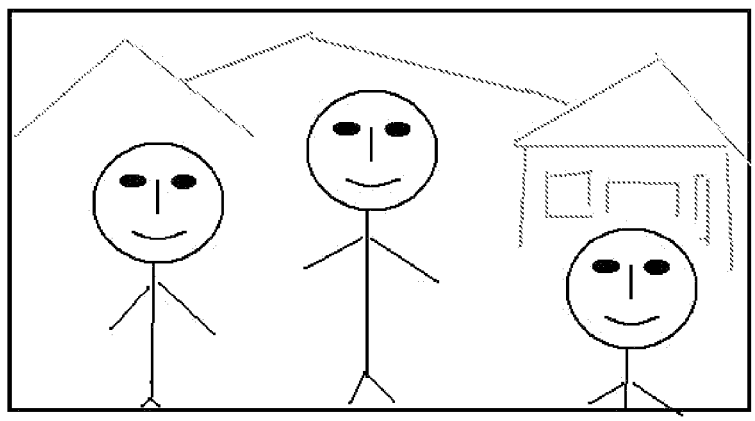
FIG. 22A
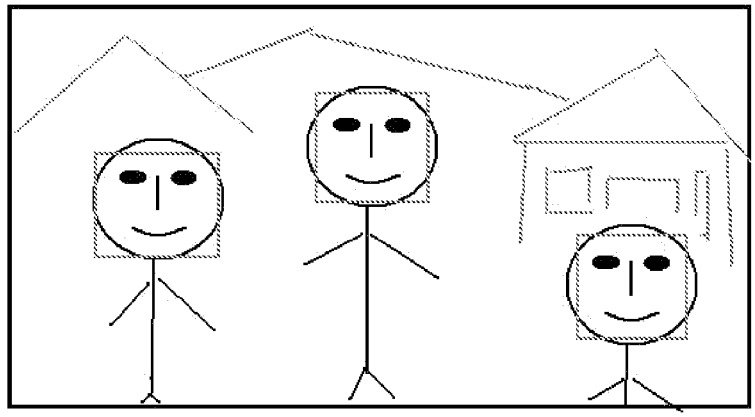
FIG. 22B
| LAYERS | SEARCH SPACE REJECTION ACHIEVED |
|---|---|
| LAYER - 1 | 4 % |
| LAYER - 1, 2 | 96.28 % |
| LAYER - 1, 2, 3, 4 | 99.77 % |
| LAYER - 1, 2, 3, 4, 5 | 99.991 % |
FIG. 22C

DETECTING OBJECTS OF INTEREST IN STILL IMAGES

CROSS REFERENCE TO RELATED APPLICATIONS

This application claims the benefit of non-provisional patent application number 428/CHE/2010 titled "Detecting Objects Of Interest In Still Images", filed on Feb. 19, 2010 in the Indian Patent Office.

The specification of the above referenced patent application is incorporated herein by reference in its entirety.

BACKGROUND

Face detection algorithms can be broadly classified into four categories, namely, knowledge-based methods, feature-invariant approaches, template matching methods, and appearance-based methods. A knowledge-based method is a top down approach to face detection, where human knowledge of facial features is coded as rules that define a face. A feature-invariant approach is a bottom up approach to face detection, which is based on the understanding that face regions contain a set of illumination and pose invariant features. These features are local features such as edges and average intensities of regions within a face. The relation between local features is also exploited for face detection. In a template matching method, several templates covering possible variations of faces are stored and correlations between the input image and the templates are computed. An image is classified as either face or non face based on a measure of deviation of the input image from the templates. In an appearance-based method, models for a face are learned from a training set and then used to detect faces. Each model is expected to incorporate the possible variations in face shapes and illuminations.

In any of the above approaches, face detection in a still image involves searching for a face sub image or sub images within the space of an input image when the image contains more than one face. Since the search space is very large, the face detection algorithm is required to have low complexity if the face detector is employed on live videos. The appearance-based approaches can deliver the accuracy required but at a high computation cost and complexity. Algorithms such as feature invariant approaches have low complexity but may not deliver the desired accuracy in certain applications.

Hence, there is a need for a computationally efficient hybrid computer implemented method and system for detecting interest sections, for example, face sections, in a still image.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above stated need for a hybrid and computationally efficient method and system for detecting interest sections in a still image. The interest sections in the still image are, for example, frontal human faces or other objects of interest. A search for interest sections in the still image employs a predetermined number of coarse-to-fine filtering stages or layers for obtaining potential interest candidates with greater precision at each higher layer. The computer implemented method and system disclosed herein relies on the fact that most non-interest candidates can be filtered out by computationally simpler feature calculations and pixel based segmentation.

The still image is analyzed by employing observation windows or sub images at all possible sections and scales of the still image. The still image may contain one or more objects of interest in one or more sub images of the still image. The pixels in the sub images are subjected to color segmentation in one or more color spaces at a first layer. As used herein, segmentation of the sub images refers to labeling of each pixel in the sub images as either a pixel of interest or a pixel of non interest. The pixels of interest are, for example, skin pixels. The sub images are categorized into interest sub images and non interest sub images based on the color segmentation. In a second layer, a gray scale version of the interest sub images and/or a binary image version of the interest sub images are matched with a predefined template for filtering the interest sub images based on relative densities of the pixels of interest and relative average intensities of predetermined features in the interest sub images. The predetermined features in the interest sub images comprise, for example, eyes, nose, and cheek regions of a face.

Prior to the second layer filtering, the binary image versions of the interest sub images are obtained from the still image. The still image is analyzed in one or more color spaces. Each color component of each of multiple pixels in the still image is compared with a threshold value for the color component based on predetermined criteria. The predetermined criteria comprise, for example, a range of potential color tones of prospective interest sections in the interest sub images, contrast quality of the still image, etc. The pixels of interest and/or pixels of non interest are determined from among the pixels based on the comparison. The binary image version of the interest sub images having the determined pixels of interest is obtained based on the analysis of the still image.

At the second layer, the gray scale version of the interest sub images is matched with the predefined template. A horizontal projection of intensities of multiple gray pixels in the gray scale version of the interest sub images is obtained. The average intensities of the predetermined features in the interest sub images are measured based on measurements from the horizontal projection. The average intensities corresponding to the predetermined features in the interest sub images are compared with one another for mapping locations and verifying the existence of the predetermined features.

The computer implemented method and system disclosed herein also provides a tilt-invariant approach for detecting interest sections, for example, face sections. The computer implemented method and system disclosed herein estimates and corrects a tilt in each of the filtered interest sub images. The estimated tilt is corrected based on the relative average intensities of the predetermined features in the filtered interest sub images to obtain corrected interest sub images. Histogram equalization is performed for the filtered interest sub images using image histograms for adjusting contrast of the filtered interest sub images. A horizontal intensity projection is computed for the filtered interest sub images. The locations of the predetermined features are identified in the filtered interest sub images relative to one another using the horizontal intensity projection. The average intensities on the filtered interest sub image are measured. The average intensities corresponding to the locations of the predetermined features in the filtered interest sub images are compared at different predefined tilt angles. A maximum relative average intensity of two or more of the predetermined features is obtained at one of the predefined tilt angles that corresponds to a compensation tilt in each of the filtered interest sub images. The tilt is corrected by introducing the compensation tilt in each of the filtered interest sub images for obtaining the corrected interest sub images.

Multiple prospective image sections comprising one or more of prospective interest sections and prospective near interest sections are determined by performing discriminative feature analyses of the filtered interest sub images using, for example, a gabor feature filter. The prospective interest sections are, for example, prospective face sections and the prospective near interest sections are, for example, prospective near face sections. The discriminative feature analyses are processed by a boosted cascade of classifiers. The boosted cascade of classifiers detects the interest sections in the still image from the prospective interest sections and the prospective near interest sections in a third layer. The boosted cascade of classifiers comprises, for example, one or more linear classifiers.

Discriminative feature analyses of the filtered interest sub images are performed using the gabor feature filter. The filtered interest sub images are resized and normalized to a predetermined dimension. The resized interest sub images are subjected to a gabor feature transform by passing the resized interest sub images through the gabor feature filter for obtaining first feature vectors corresponding to the prospective interest sections and the prospective near interest sections. The obtained first feature vectors are subjected to a principal component analysis for obtaining two sets of prominent eigen vectors. For example, the two sets of prominent eigen vectors correspond to prominent eigen vectors of a face class and a near face class. The obtained first feature vectors are projected on the prominent eigen vectors for obtaining final feature vectors. The final feature vectors are classified using one or more boosted cascade of classifiers for obtaining the interest sections and non interest sections. For example, the interest sections correspond to face sections, and the non interest sections correspond to non face sections.

In an embodiment, a fourth computationally complex layer is employed using a support vector machine (SVM) classifier. If the boosted cascade of classifiers detects at least one interest section in the still image, the detected interest sections are subjected to the SVM classifier. The detected interest sections are resized and normalized to a predetermined dimension. Brightness variations on the resized interest sections are compensated using a least squares fit plane. Histogram equalization is performed for the compensated interest sections for adjusting contrast of grayscale versions of the compensated interest sections. The SVM classifier is trained with labeled training samples as data points to construct an optimal hyper plane. The histogram equalized interest sections are subjected to the SVM classifier as data points for further detecting interest sections using the optimal hyper plane.

In an embodiment, gabor feature extraction is performed for training one or more of the boosted cascade of classifiers for determining the prospective image sections. The filtered interest sub images are resized and normalized to a predetermined dimension. The resized interest sub images are subjected to a gabor feature transform by passing the resized interest sub images through the gabor feature filter for obtaining first feature vectors corresponding to the prospective interest sections and the prospective near interest sections. A predetermined number of training samples are obtained from the first feature vectors corresponding to the prospective interest sections and the prospective near interest sections. The training samples corresponding to the prospective interest sections and the prospective near interest sections are subjected to a principal component analysis for obtaining two sets of prominent eigen vectors. The training samples are projected on the obtained prominent eigen vectors for obtaining gabor discriminative features. The boosted cascade of classifiers is trained to recognize the interest sections and the non interest sections from the gabor discriminative features.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

FIGS. 22A-22B exemplarily illustrate an output of an interest section detector for a sample input still image.

FIG. 22C exemplarily tabulates the layer-wise non face rejection capabilities with a sample input image.

DETAILED DESCRIPTION OF THE INVENTION

Figure 1:
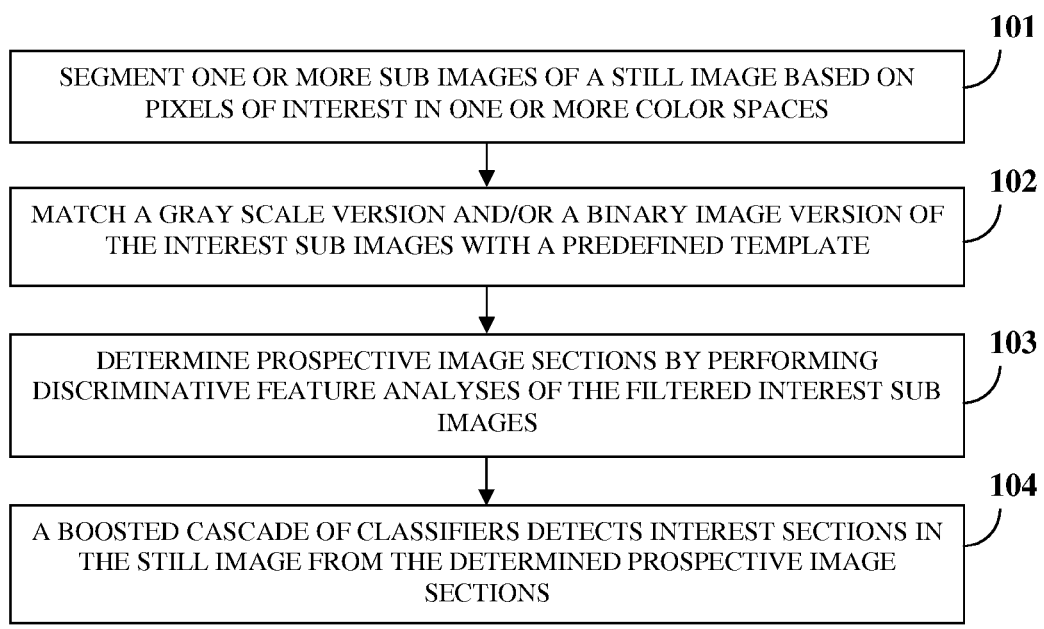
FIG. 1 illustrates a computer implemented method for detecting interest sections in a still image.

FIG. 1 illustrates a computer implemented method for detecting interest sections in a still image. As used herein, the term "interest sections" refers to those sections of the still image that contain objects of interest or objects of a given class. Also, as used herein, "near interest sections" refer to those sections of the still image whose characteristics are similar to those of the interest sections. The interest sections in the still image are, for example, frontal human faces or other objects of interest in the still image. The still image is analyzed by employing observation windows or sub images at all possible sections and scales of the still image. As used herein, the sub images are, for example, square or rectangular portions of the image at multiple locations and scales. The still image may contain one or more objects of interest in one or more sub images of the still image. The pixels in the sub images are subjected to color segmentation 101 in one or more color spaces in a first layer. As used herein, segmentation of the sub images refers to labeling of each pixel in the sub images as either a pixel of interest or a pixel of non interest. The pixels of interest are, for example, skin pixels. The sub images are categorized into one or more of interest sub images and multiple non interest sub images based on the color segmentation. For example, one of the criteria for a sub image to be categorized as an interest sub image is that the density of the pixels of interest in the sub image must be greater than a predetermined threshold. In a second layer, a gray scale version of the interest sub images and/or a binary image version of the interest sub images are compared or matched 102 with a predefined template for filtering the interest sub images based on relative densities of the pixels of interest and relative average intensities of predetermined features in the interest sub images. The predefined template contains, for example, information about the typical average intensities of eyes, nose and cheek regions for possible variations of faces. As used herein, the predetermined features in the interest sub images refer to features that are known to constitute an object of interest, such as a face. The predetermined features in the interest sub images comprise, for example, eyes, nose, and cheek regions of a face.

Figure 5:
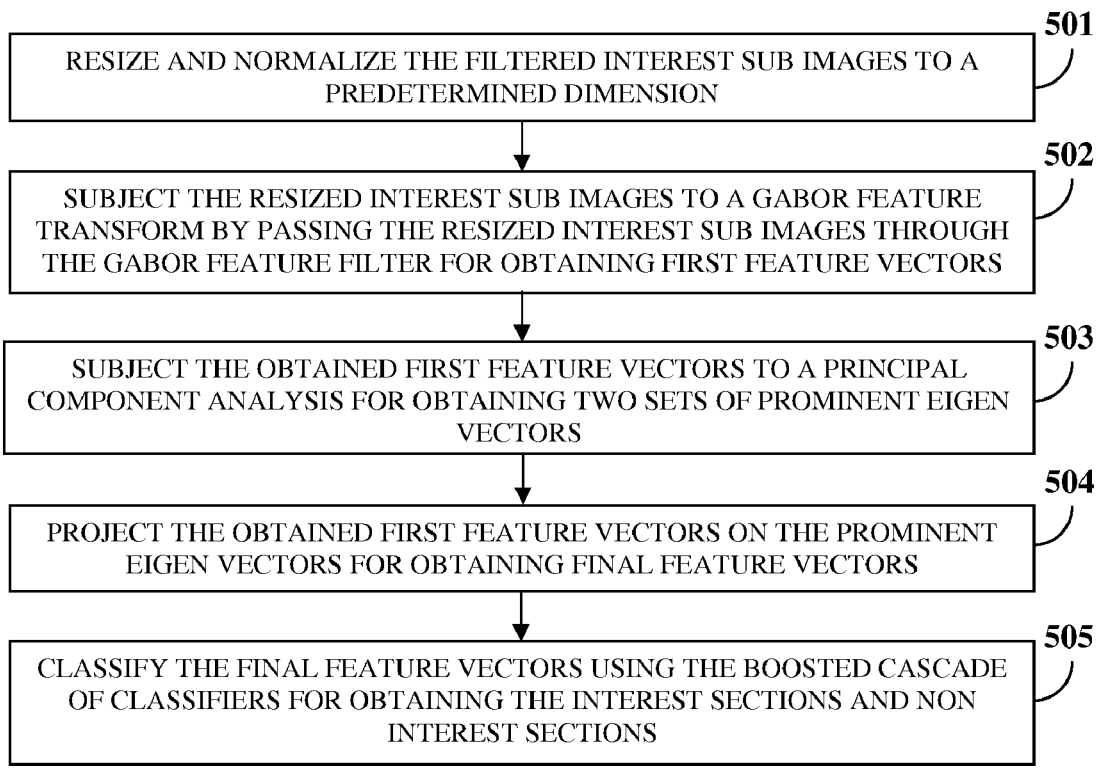
FIG. 5 exemplarily illustrates a computer implemented method for performing discriminative feature analyses of the filtered interest sub images using a gabor feature filter.

Multiple prospective image sections comprising one or more of prospective interest sections and prospective near interest sections are determined 103 by performing discriminative feature analyses of the filtered interest sub images using, for example, a gabor feature filter, as disclosed in the detailed description of FIG. 5. As used herein, "prospective interest sections" refer to those sections of the still image that potentially contain objects of interest or objects of a given class. Also, as used herein, "prospective near interest sections" refer to those sections of the still image whose characteristics are similar to those of the prospective interest sections. The prospective interest sections are, for example, prospective face sections and the prospective near interest sections are, for example, prospective near face sections. The discriminative feature analyses are processed by a boosted cascade of classifiers. The boosted cascade of classifiers detects 104 the interest sections in the still image from the prospective interest sections and the prospective near interest sections, in a third layer. The boosted cascade of classifiers comprises, for example, one or more linear classifiers.

In an embodiment, a fourth computationally complex layer is employed using a support vector machine (SVM) classifier. If the boosted cascade of classifiers detects at least one interest section in the still image, the detected interest sections are subjected to the SVM classifier as disclosed in the detailed description of FIG. 6.

Figure 2:
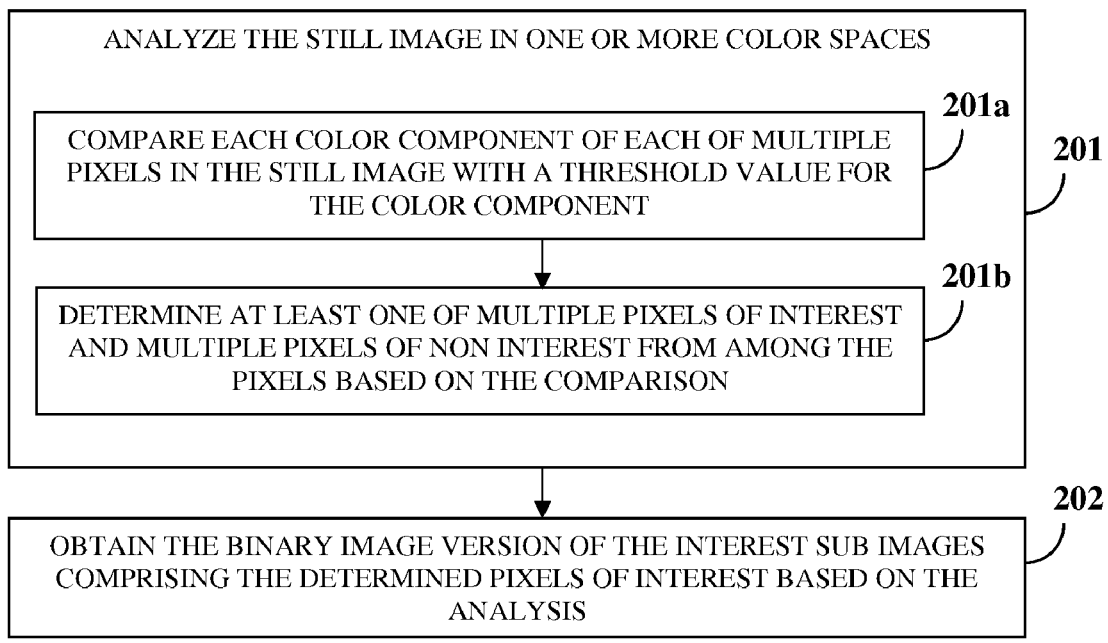
FIG. 2 exemplarily illustrates a computer implemented method for obtaining a binary image version of the interest sub images from the still image.

Prior to the second layer filtering, the binary image versions of the interest sub images are obtained from the still image. FIG. 2 exemplarily illustrates a computer implemented method for obtaining the binary image version of the interest sub images from the still image. The still image is analyzed 201 in one or more color spaces. Each color component of each of multiple pixels in the still image is compared 201a with a threshold value for the color component based on predetermined criteria. The predetermined criteria for the comparison comprise, for example, a range of potential color tones of the prospective interest sections, for example, skin color tones, in the interest sub images, contrast quality of the still image, etc. The pixels of interest and/or pixels of non interest are determined 201b from among the pixels based on the comparison. The binary image version of the interest sub images having the determined pixels of interest is obtained 202 based on the analysis of the still image.

Figure 3:
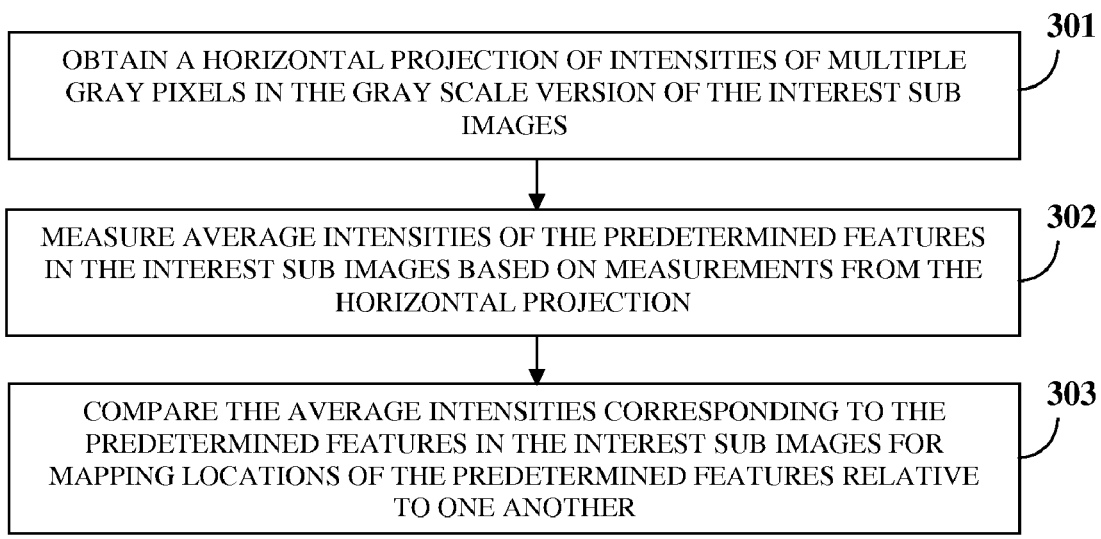
FIG. 3 exemplarily illustrates a computer implemented method for matching a gray scale version of the interest sub images with a predefined template.

At the second layer, the gray scale version of the interest sub images is matched with the predefined template. FIG. 3 exemplarily illustrates a computer implemented method for matching a gray scale version of the interest sub images with a predefined template. A horizontal projection of intensities of multiple gray pixels in the gray scale version of the interest sub images is obtained 301. The average intensities of the predetermined features in the interest sub images are measured 302 based on measurements from the horizontal projection. The predetermined features comprise, for example, eyes, nose, and cheek regions of a face. The average intensities corresponding to the predetermined features in the interest sub images are compared 303 with one another for mapping locations of the predetermined features relative to one another.

Figure 4:
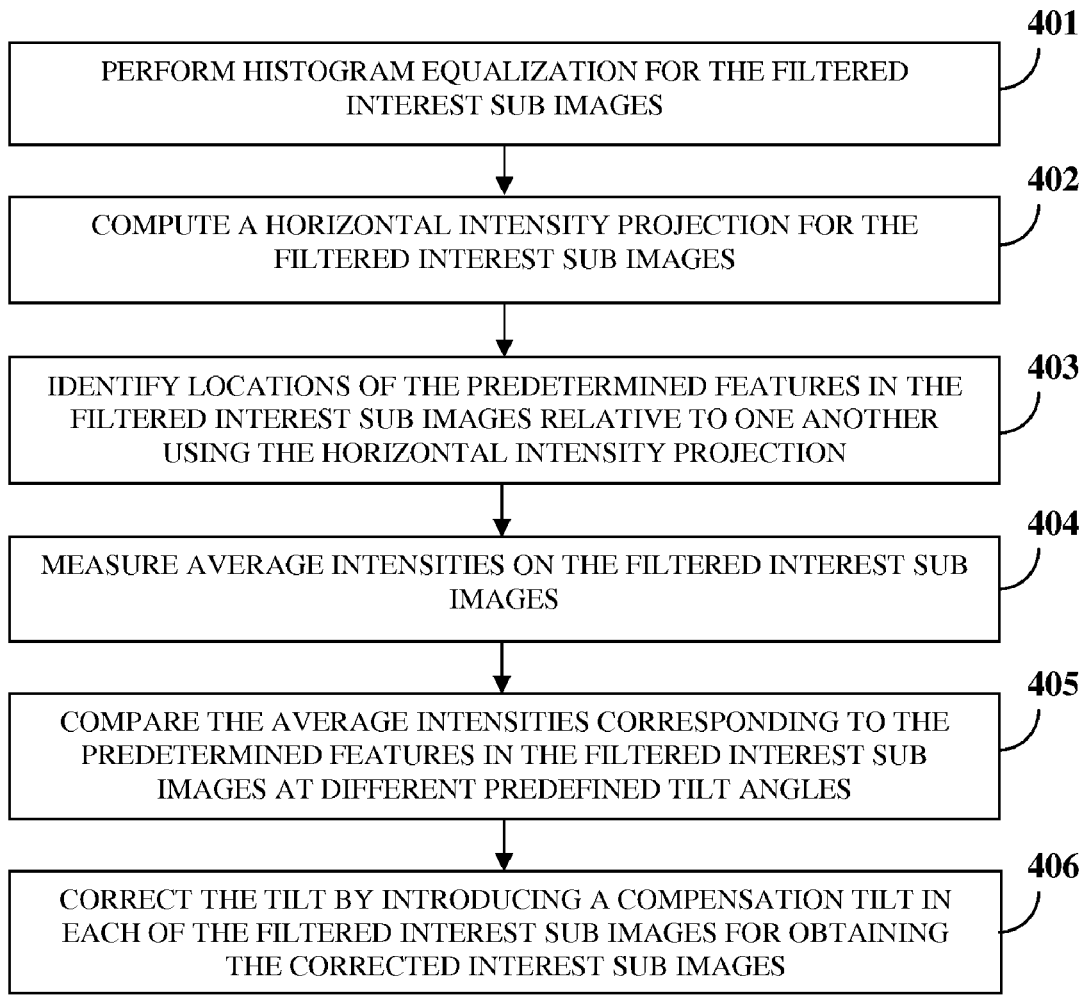
FIG. 4 exemplarily illustrates a computer implemented method for estimating and correcting tilt in a filtered interest sub image.

FIG. 4 exemplarily illustrates a computer implemented method for estimating and correcting tilt in a filtered interest sub image. As used herein, "tilt" in an interest sub image refers to the in-plane rotation of the interest section or the object of interest. The estimated tilt is corrected based on the relative average intensities of the predetermined features in the filtered interest sub images for obtaining corrected interest sub images. Histogram equalization for the filtered interest sub images is performed 401 using image histograms for adjusting contrast of the filtered interest sub images. As used herein, "histogram equalization" refers to the contrast enhancement of an image or sections of an image. A horizontal intensity projection is computed 402 for the filtered interest sub images. For example, the horizontal intensity projection $(H(y))$ is computed using the following equation:
$H(y)=\Sigma_x I(x,y)$, where $x=1: N$ and $y=1: M$, where x and y are the pixel co-ordinates; N is the number of rows in the image matrix; and M is the number of rows in the image grid. The locations of the predetermined features in the filtered interest sub images relative to one another are identified 403 using the horizontal intensity projection. The average intensities on the filtered interest sub images are measured 404. The average intensity (A) is measured using the following equation: $A=\Sigma_x \Sigma_y I(x,y)/(U*V)$; where x=1: U & y=1: V, where x and y are the pixel co-ordinates; U is the number of rows in the image matrix; and V is the number of rows in the image grid.

The average intensities corresponding to the locations of predetermined features in the filtered interest sub images are compared 405 at different predefined tilt angles. A maximum relative average intensity of two or more of the predetermined features is obtained at one of the predefined tilt angles that corresponds to a compensation tilt in each of the filtered interest sub images. The tilt is corrected 406 by introducing the compensation tilt in each of the filtered interest sub images for obtaining the corrected interest sub images.

FIG. 5 exemplarily illustrates a computer implemented method for performing discriminative feature analyses of the filtered interest sub images using a gabor feature filter. The filtered interest sub images are resized and normalized 501 to a predetermined dimension, for example, N×N dimension such as 25×25. The resized interest sub images are subjected 502 to a gabor feature transform by passing the resized interest sub images through the gabor feature filter for obtaining first feature vectors corresponding to the prospective interest sections and the prospective near interest sections. The obtained first feature vectors are subjected 503 to a principal component analysis (PCA) for obtaining two sets of prominent eigen vectors. PCA is a mathematical procedure that transforms or reduces the high dimensional data of the feature vectors into a smaller number of principal or prominent vectors. The two sets of prominent eigen vectors, for example, correspond to prominent eigen vectors of a face class and a near face class. The obtained first feature vectors are projected 504 on the prominent eigen vectors for obtaining final feature vectors. The final feature vectors are classified 505 using one or more of the boosted cascade of classifiers for obtaining the interest sections and non interest sections. For example, the interest sections correspond to face sections, and the non interest sections correspond to non face sections. As used herein, "face sections" refer to those sections of the still image that potentially contain faces or objects of a face class. Also, as used herein, "near face sections" refer to those sections of the still image whose characteristics are similar to those of face sections.

Figure 6:
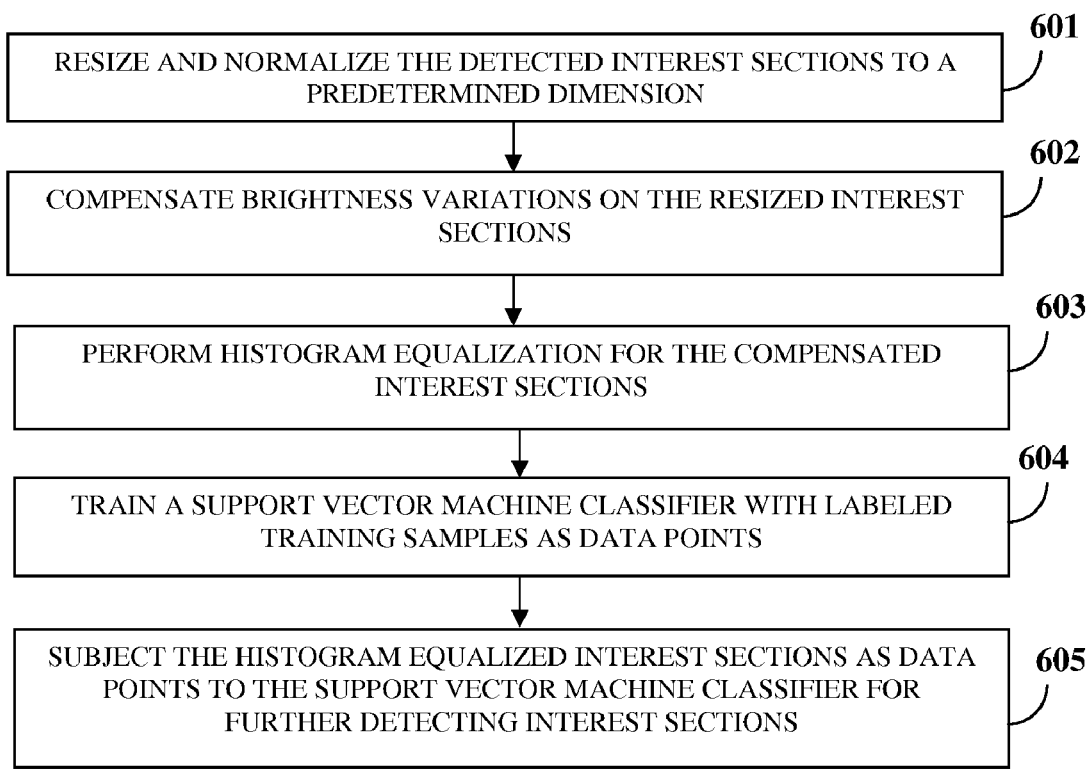
FIG. 6 exemplarily illustrates a computer implemented method for subjecting the detected interest sections to a support vector machine classifier.

In an embodiment, a fourth computationally complex layer is employed using a support vector machine (SVM) classifier. FIG. 6 exemplarily illustrates a computer implemented method for subjecting the detected interest sections to the SVM classifier. If the boosted cascade of classifiers detects at least one interest section in the still image, the detected interest sections are subjected to the SVM classifier. The detected interest sections are resized and normalized 601 to a predetermined dimension. Brightness variations on the resized interest sections are compensated 602 using a least squares fit plane. Histogram equalization for the compensated interest sections is performed 603 for adjusting contrast of grayscale versions of the compensated interest sections. The SVM classifier is trained 604 with labeled training samples as data points to construct an optimal hyper plane. The histogram equalized interest sections are subjected 605 to the SVM classifier as data points for further detecting interest sections using the optimal hyper plane.

Figure 7:
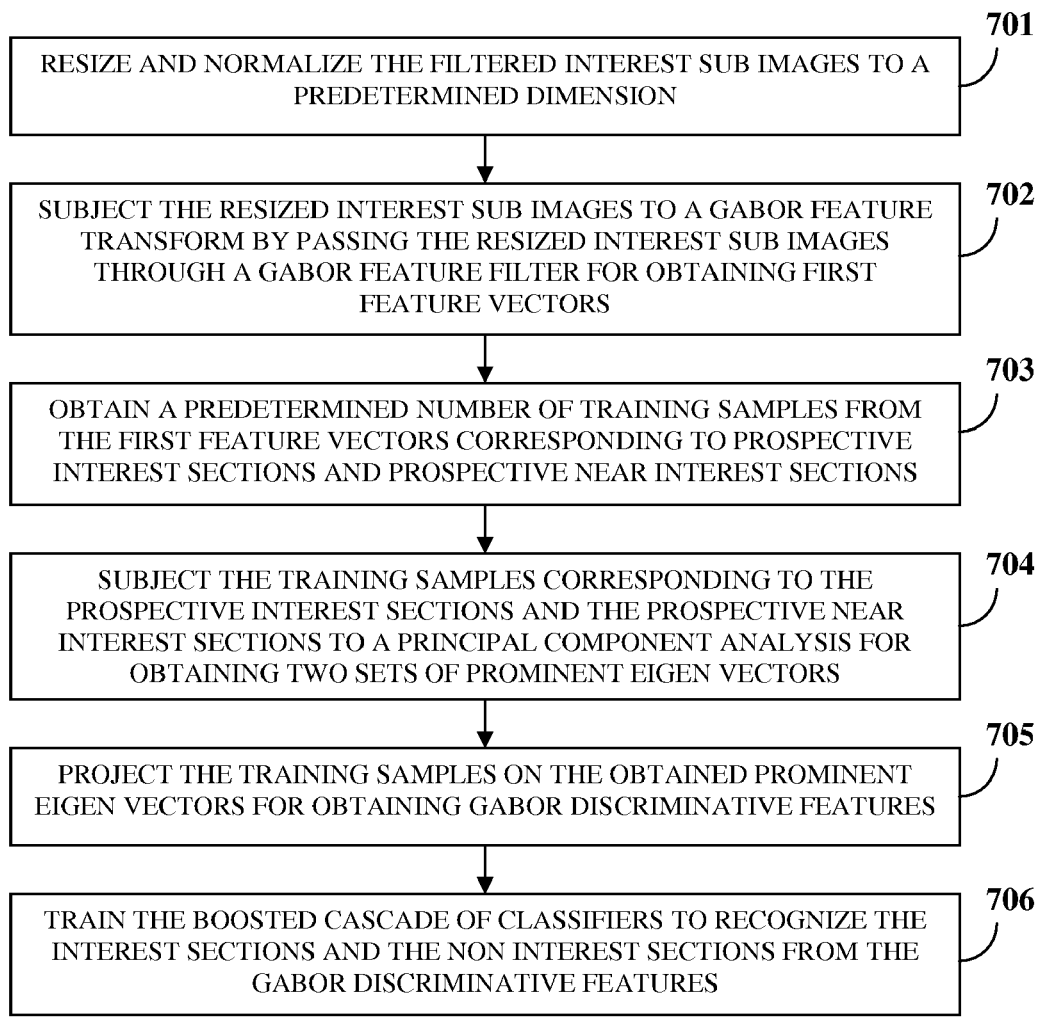
FIG. 7 exemplarily illustrates a computer implemented method for training a boosted cascade of classifiers for determining prospective image sections by performing gabor feature extraction.

FIG. 7 exemplarily illustrates a computer implemented method for training the boosted cascade of classifiers for determining prospective image sections by performing gabor feature extraction. The filtered interest sub images are resized and normalized 701 to a predetermined dimension. The resized interest sub images are subjected 702 to a gabor feature transform by passing the resized interest sub images through a gabor feature filter for obtaining first feature vectors corresponding to the prospective interest sections and the prospective near interest sections. A predetermined number of training samples are obtained 703 from the first feature vectors corresponding to the prospective interest sections and the prospective near interest sections. The training samples corresponding to the prospective interest sections and the prospective near interest sections are subjected 704 to a principal component analysis for obtaining two sets of prominent eigen vectors. The training samples are projected 705 on the obtained prominent eigen vectors for obtaining gabor discriminative features. As used herein, "gabor discriminative features" are discriminative features obtained by filtering the sub images using a 2-D gabor filter whose impulse response is defined by a 2-d harmonic function multiplied with a Gaussian function and projecting the filter response on prominent eigen vectors of, for example, a face and a near face class. The boosted cascade of classifiers is trained 706 to recognize the interest sections and the non interest sections from the gabor discriminative features.

Figure 8:
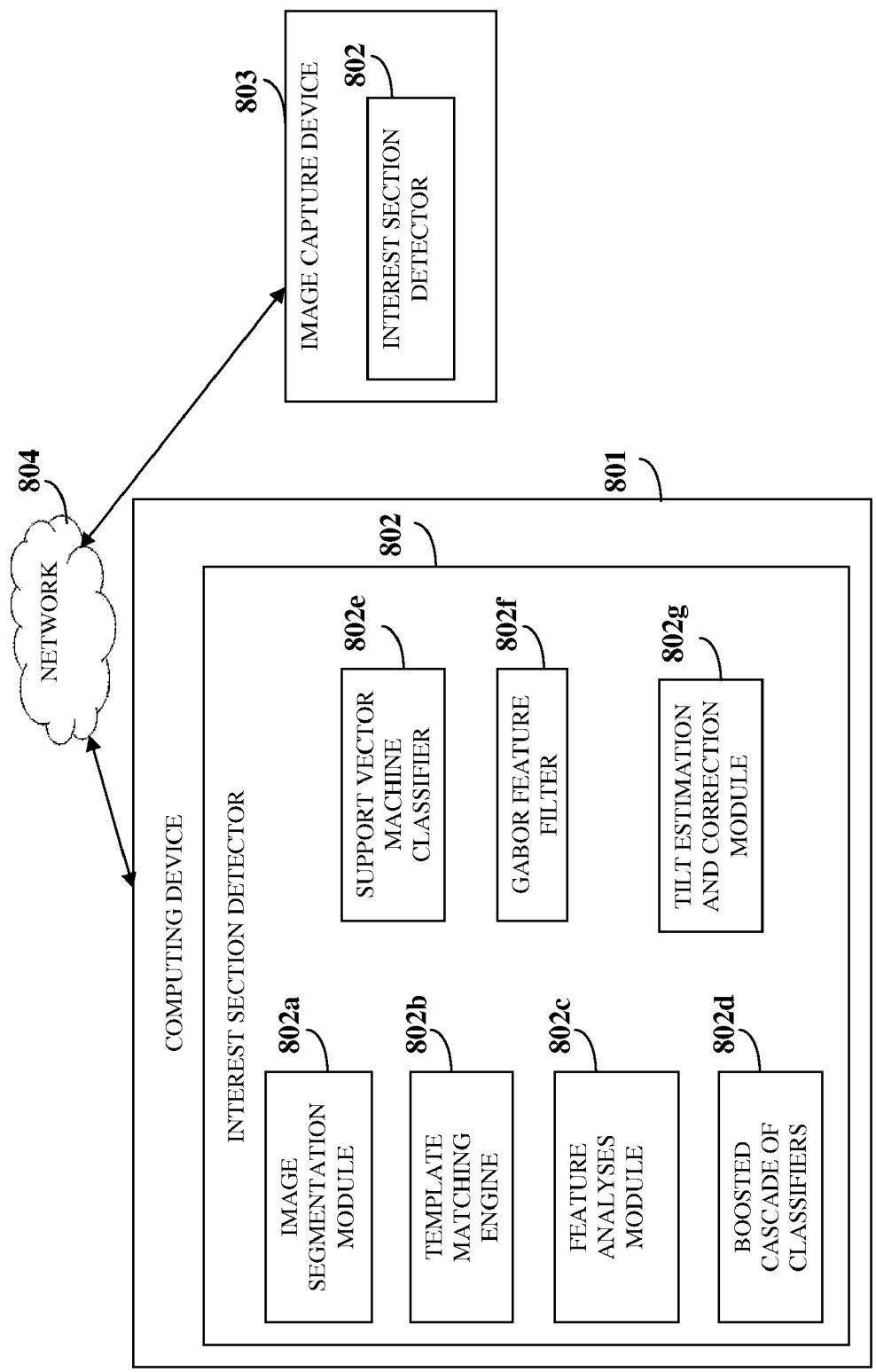
FIG. 8 exemplarily illustrates a computer implemented system for detecting interest sections in a still image.

FIG. 8 exemplarily illustrates a computer implemented system for detecting interest sections in a still image. The computer implemented system comprises an interest section detector 802 provided, for example, on a computing device 801 or an image capture device 803. The interest section detector 802 comprises an image segmentation module 802a, a template matching engine 802b, a feature analyses module 802c, a boosted cascade of classifiers 802d, a gabor feature filter 802f, a support vector machine (SVM) classifier 802e, and a tilt estimation and correction module 802g. In an embodiment, the interest section detector 802, for example, a face detector, in the case where the object of interest is a face, is deployed on the image capture device 803. In another embodiment, the interest section detector 802 may be deployed on a computing device 801 disposed on a network 804 over which the captured images are transferred to the computing device 801 for detecting interest sections in the captured images. The computing device 801 is, for example, a personal computer, a server computer, a portable computer, etc. In another embodiment, the interest section detector 802 is deployed on a portable communication device, for example, a mobile device with an integrated camera or a mounted camera.

The image segmentation module 802a subjects one or more sub images of the still image to color segmentation based on pixels of interest, for example, skin pixels in one or more color spaces. The sub images are categorized into one or more of interest sub images and multiple non interest sub images based on the color segmentation. The template matching engine 802b matches a gray scale version and/or a binary image version of the interest sub images with a predefined template for filtering the interest sub images based on relative densities of the skin pixels and relative average intensities of predetermined features in the interest gray sub images. The tilt estimation and correction module 802g estimates a tilt in each of the filtered interest sub images and corrects the estimated tilt based on the relative average intensities of the predetermined features in the filtered interest sub images for obtaining corrected interest sub images as disclosed in the detailed description of FIG. 4.

The feature analyses module 802c determines prospective image sections comprising prospective interest sections and/or prospective near interest sections by performing discriminative feature analyses of the filtered interest sub images using the gabor feature filter 802f as disclosed in the detailed description of FIG. 5. The boosted cascade of classifiers 802d detects the interest sections in the still image from the prospective interest sections and prospective near interest sections. The support vector machine (SVM) classifier 802e further detects interest sections in the still image, if the boosted cascade of classifiers 802d detects at least one interest section in the still image as disclosed in the detailed description of FIG. 6. This layer involving the SVM classifier 802e is used to confirm the existence of an interest section in less than 0.5% of the still image area. The boosted cascade of classifiers 802d are trained for determining multiple prospective image sections by gabor feature extraction as disclosed in the detailed description of FIG. 7.

Figure 9:
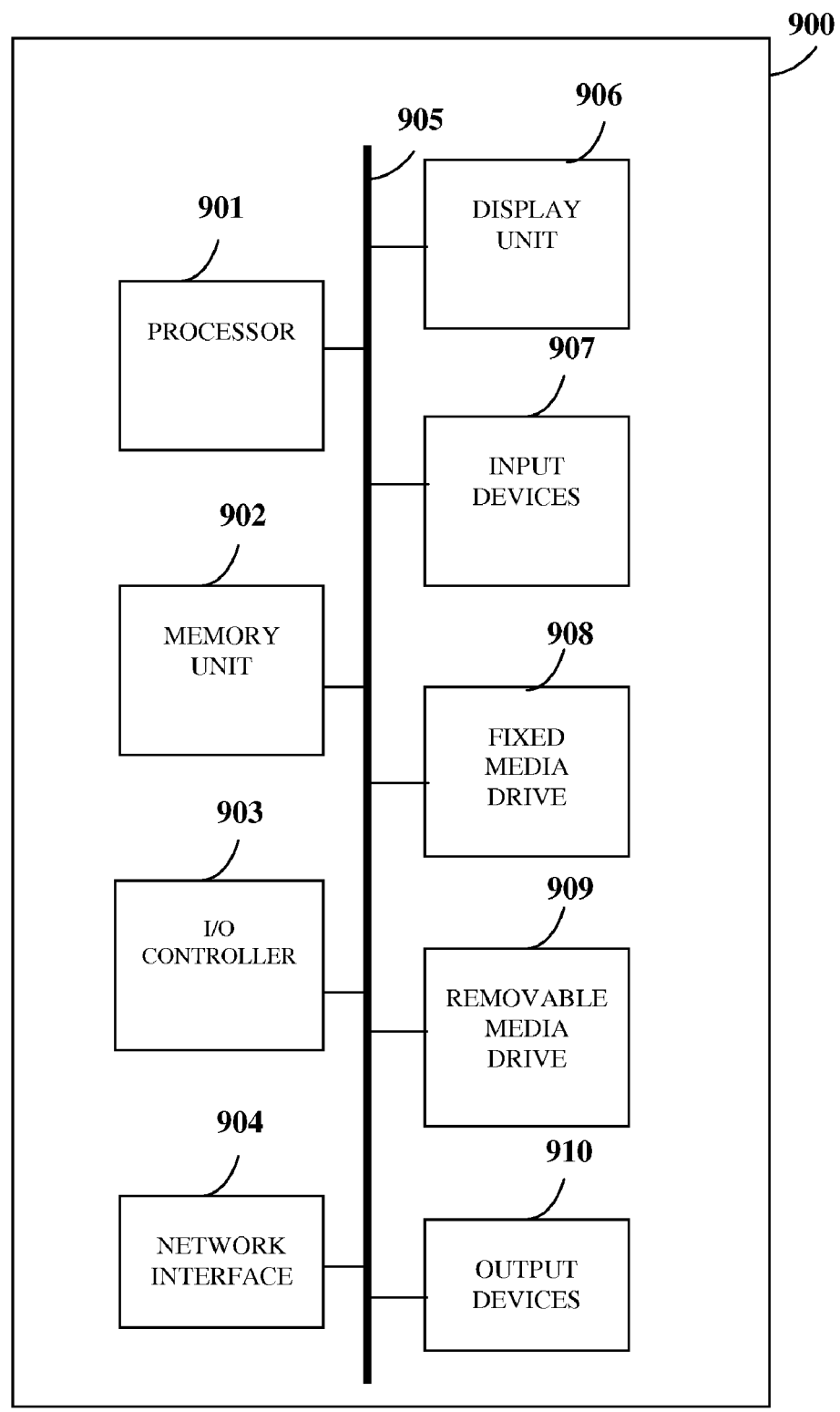
FIG. 9 exemplarily illustrates the architecture of a computer system used for detecting interest sections in a still image.

FIG. 9 exemplarily illustrates the architecture of a computer system 900 used for detecting interest sections in a still image. For purposes of illustration, the detailed description discloses the interest section detector 802 installed in the computer system 900, however the scope of the computer implemented method and system disclosed herein is not limited to the interest section detector 802 installed in the computer system 900 but may be extended to include the interest section detector 802 installed on the image capture device 803, or the portable communication device. Also, the image capture device 803, the computing device 801, and the portable communication device employ the architecture of the computer system 900 exemplarily illustrated in FIG. 9, or employ a subset or a superset of the architecture of FIG. 9, and carry sufficient processing capability to run the interest section detector 802.

The image capture device 803 and the computing device 801 communicate with each other via the network 804. The network 804 is, for example, a wireless network, a wired network, a local area network (LAN), a wide area network (WAN), a cellular network, a satellite network, etc. The computer system 900 comprises, for example, a processor 901, a memory unit 902 for storing programs and data, an input/output (I/O) controller 903, a network interface 904, a network bus 905, a display unit 906, input devices 907, a fixed media drive 908, a removable media drive 909, an output device 910, for example, a printer, etc.

The processor 901 is an electronic circuit that can execute computer programs. The memory unit 902 is used for storing programs, applications, and data. For example, the interest section detector 802 is stored on the memory unit 902 of the computer system 900. The memory unit 902 is, for example, a random access memory (RAM) or another type of dynamic storage device that stores information and instructions for execution by the processor 901. The memory unit 902 also stores temporary variables and other intermediate information used during execution of the instructions by the processor 901. The computer system 900 further comprises a read only memory (ROM) or another type of static storage device that stores static information and instructions for the processor 901. The network interface 904 enables connection of the computer system 900 to the network 804. The I/O controller 903 controls the input and output actions performed by the user. The network bus 905 permits communication between the modules, for example, 802a, 802b, 802c, 802d, 802e, 802f, and 802g of the computer implemented system disclosed herein.

The display unit 906 displays results of the interest section detector 802 to the user. The input devices 907 are used for inputting data into the computer system 900. The input devices 907 are, for example, a keyboard such as an alphanumeric keyboard, a joystick, a mouse, a touch pad, a light pen, etc. The computer system 900 further comprises a fixed media drive 908 and a removable media drive 909 for receiving removable media.

Computer applications and programs are used for operating the computer system 900. The programs are loaded onto the fixed media drive 908 and into the memory unit 902 of the computer system 900 via the removable media drive 909. In an embodiment, the computer applications and programs may be loaded directly through the network 804. Computer applications and programs are executed by double clicking a related icon displayed on the display unit 906 using one of the input devices 907. The user interacts with the computer system 900 using a graphical user interface (GUI) of the display unit 906.

The computer system 900 of the image capture device 803 and the computing device 801 employs operating systems for performing multiple tasks. An operating system is responsible for the management and coordination of activities and the sharing of the resources of the computer system 900. The operating system further manages security of the computer system 900, peripheral devices connected to the computer system 900, and network connections. The operating system employed on the computer system 900 recognizes, for example, inputs provided by the user using one of the input devices 907, the output display, files and directories stored locally on the fixed media drive 908, etc. The operating system on the computer system 900 of the image capture device 803 executes different programs initiated by the user using the processor 901.

Instructions for executing the interest section detector 802 are retrieved by the processor 901 from the program memory in the form of signals. Location of the instructions in the program memory is determined by a program counter (PC). The program counter stores a number that identifies the current position in the program of the interest section detector 802.

The instructions fetched by the processor 901 from the program memory after being processed are decoded. After processing and decoding, the processor 901 executes the instructions. For example, the image segmentation module 802a defines instructions for segmenting one or more sub images of the still image based on pixels of interest in one or more color spaces and categorizing the sub images into one or more of interest sub images and non interest sub images based on the segmentation. The template matching engine 802b defines instructions for matching a gray scale version and/or a binary image version of the interest sub images with a predefined template. The feature analyses module 802c defines instructions for determining prospective image sections by performing discriminative feature analyses of the filtered interest sub images. The boosted cascade of classifiers 802d defines instructions for detecting the interest sections in the still image from the prospective interest sections and prospective near interest sections. The SVM classifier 802e defines instructions for detecting interest sections in the still image, if the boosted cascade of classifiers 802d detects at least one interest section in the still image. The tilt estimation and correction module 802g defines instructions for estimating a tilt in each of the filtered interest sub images and correcting the estimated tilt, etc. which are stored in the program memory or received from a remote server.

The processor 901 retrieves the instructions defined by the image segmentation module 802a, the template matching engine 802b, the feature analyses module 802c, the boosted cascade of classifiers 802d, the SVM classifier 802e, and the tilt estimation and correction module 802g, and executes the instructions.

Figure 10:
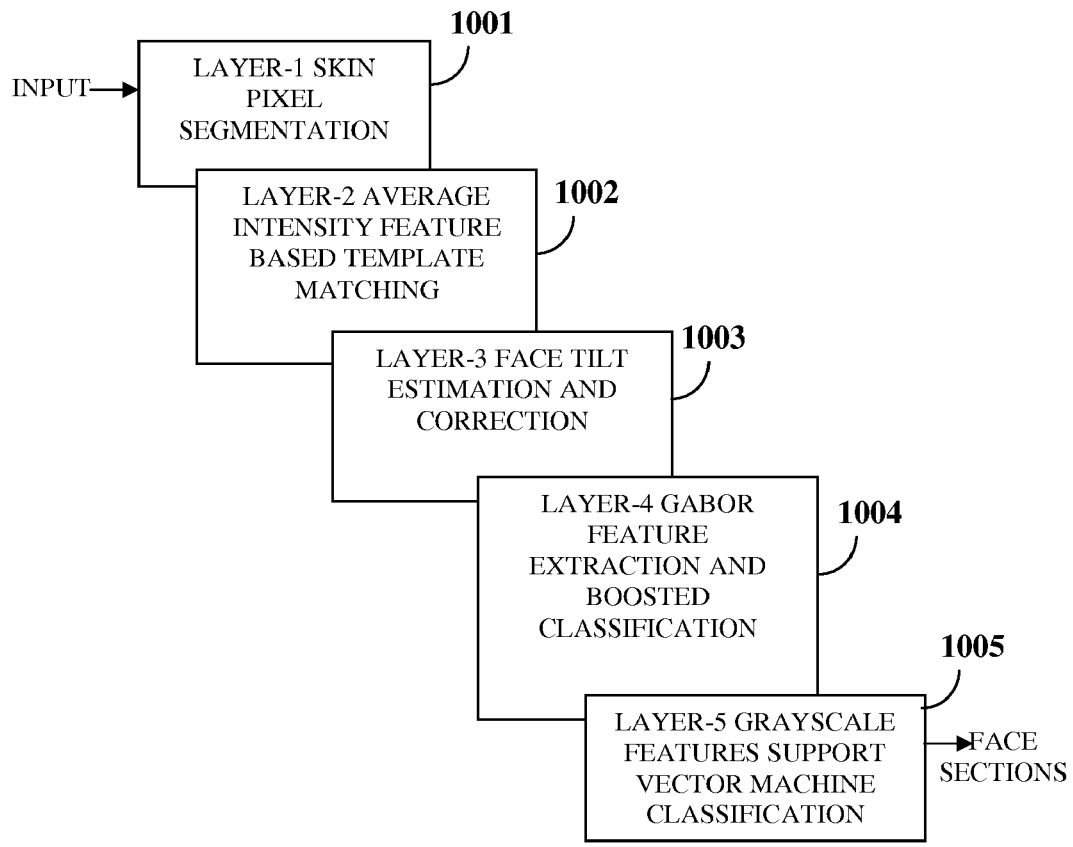
FIG. 10 exemplarily illustrates a high level layer diagram for detecting face sections in a still image.

Consider an example of detecting interest sections, for example one or more faces, in a still image by employing the interest section detector 802. FIG. 10 exemplarily illustrates a high level layer diagram for detecting face sections in a still image. The computer implemented method and system disclosed herein employs, for example, five layers 1001, 1002, 1003, 1004, and 1005 of filtering to detect face sections. The first layer 1001 referred to as "Layer 1", involves a skin pixel segmentation based on skin pixels in one or more color spaces. The basic criterion for a sub image to be a face candidate is that the skin pixel density of the sub image must be greater than a predefined threshold. At the second layer 1002 referred to as "Layer 2", a horizontal projection histogram of the candidate face sub images are computed and the vertical positions of the forehead, the eyes and the cheeks are estimated. The average intensities of the eye, nose and cheek regions are calculated. The average intensities of the eye regions are expected to be darker than the cheek and nose regions of the sub image containing a face. If these criteria for a sub image to be declared a face are met, the sub image is short listed as a possible face section. The computer implemented method and system disclosed herein is resilient to pose and is tilt invariant, as variations in pose and tilt are expected even in controlled environments. The third layer 1003, referred to as "Layer 3", estimates the tilt angle of the short listed sub images. The tilt estimation and correction module 802g maximizes the average intensity difference between the eye and cheek regions by rotating the sub image through several angles. The estimated tilt in the sub images is compensated before being passed on to the fourth layer 1004, referred to as "Layer 4". Also, by setting a limit on the amount of face tilt in a sub image, false positives, that is, falsely short listed sub images are filtered out at the fourth layer 1004.

The fourth layer 1004 is an appearance-based approach to face detection. The boosted cascade of classifiers 802d is trained on gabor features to classify the short listed sub images as face sections and non face sections. Since a non face object class cannot be accurately defined, the task of collecting a non-face data set is nontrivial. This task is simplified because the filtered interest sub images remaining after processing in the third layer 1003 contain both face and non face elements. The non face elements are designated as near-face images because their characteristics are similar to a face object class. A training data set is created by hand labeling the sub images as face and near face objects after being filtered by the first three layers 1001, 1002, and 1003. The sub images are normalized to a standard size and gabor wavelet features are extracted. These being a high dimensional data, principal component analyses (PCA) are employed to reduce the dimension of the data before passing the data to a boosted cascade of classifiers 802d. The first four layers 1001, 1002, 1003, and 1004 have the ability to reject non face objects with an average accuracy of, for example, 99.5%. An SVM classifier 802e trained on intensity compensated and histogram equalized gray sub images is used to analyze 0.5% of the sub images to detect face sections. Hence, the fifth layer 1005, referred to as "Layer 5", using the SVM classifier 802e yields the required accuracy, while the first four layers 1001, 1002, 1003, and 1004 speed up the computer implemented method for face detection.

Figure 11:
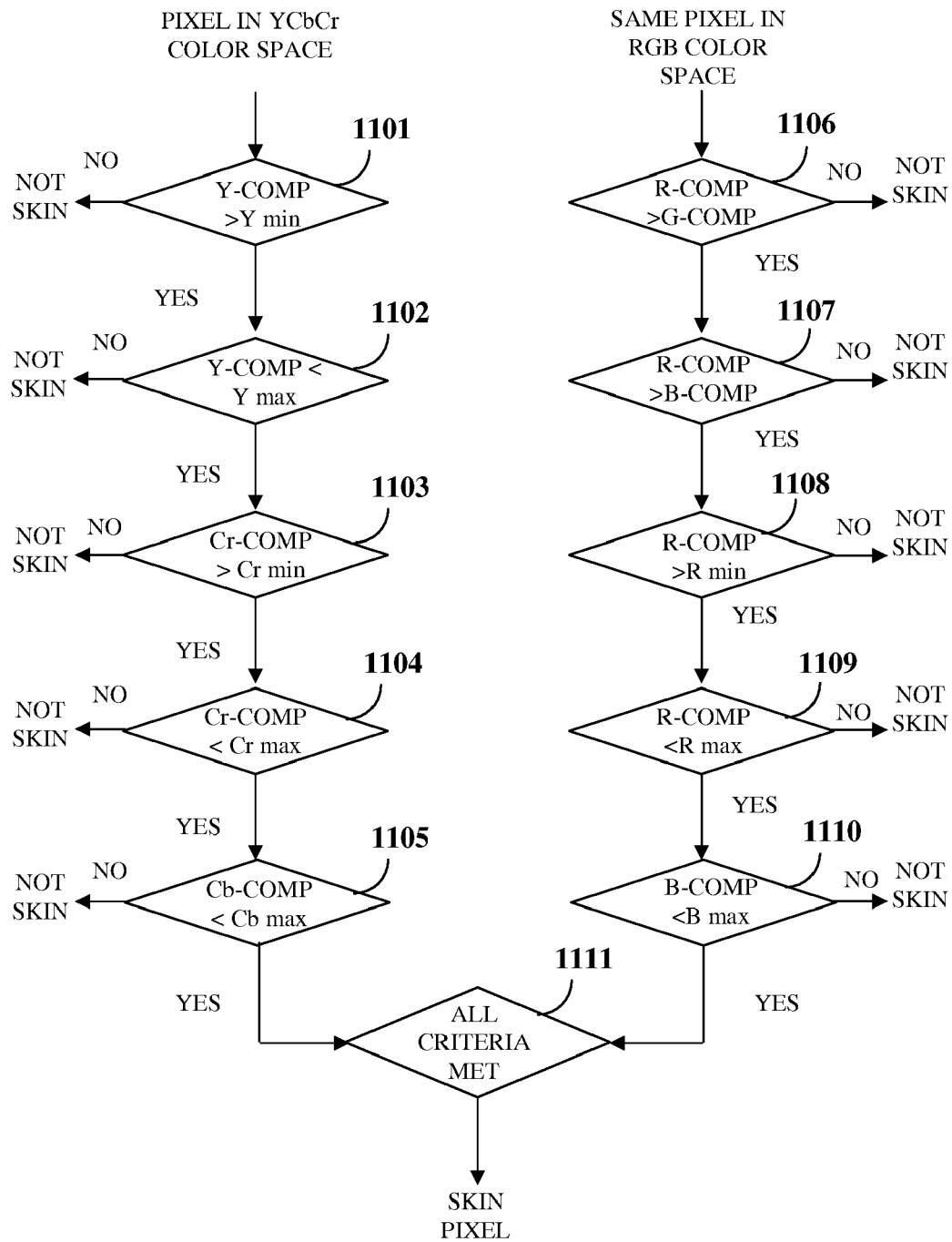
FIG. 11 illustrates a flow chart for a skin pixel segmentation algorithm.

FIG. 11 illustrates a flow chart for the skin pixel segmentation algorithm used in the first layer 1001 disclosed in the detailed description of FIG. 10. The input image is low pass filtered to remove any noise that may be present in the input image. Each individual pixel of the still image is analyzed in a red, green, and blue (RGB) color space and YCbCr color spaces to determine if the pixel represents a skin pixel. In the term YCbCr, Y is a luma component, Cb is a blue difference chroma component, and Cr is a red-difference chroma component. Selected or all color components of the individual color spaces in each pixel are compared with predefined upper and lower thresholds for the corresponding color components or with each other before declaring the pixel as a skin pixel. For example, the luma component (Y-comp) of the pixel is compared with a lower threshold (Y min) 1101 and an upper threshold (Y max) 1102. Similarly, the chroma component (Cr-comp) is compared with a lower threshold (Cr min) 1103 and an upper threshold (Cr max) 1104, and the chroma component (Cb-comp) is compared with an upper threshold (Cb max) 1105. Also, the R comp, representing red light, is compared with the G comp 1106, representing green light, and the B comp 1107, representing blue light, of the pixel. For example, if the R comp is less than either the G comp or the B comp of the pixel, the pixel is declared as a non skin pixel. The R comp is further compared with a lower threshold (R min) 1108 and an upper threshold (R max) 1109, following which the B comp is compared with an upper threshold (B max) 1110. If the above criteria are met 1111, that is, all the comparisons test true, the pixel being analyzed is declared as a skin pixel. If the criteria do not test true, the pixel being analyzed is declared as a non-skin pixel. A high percentage of false positives are expected in the first layer 1001. The thresholds are relaxed to accommodate all possible skin tones.

Figure 12:
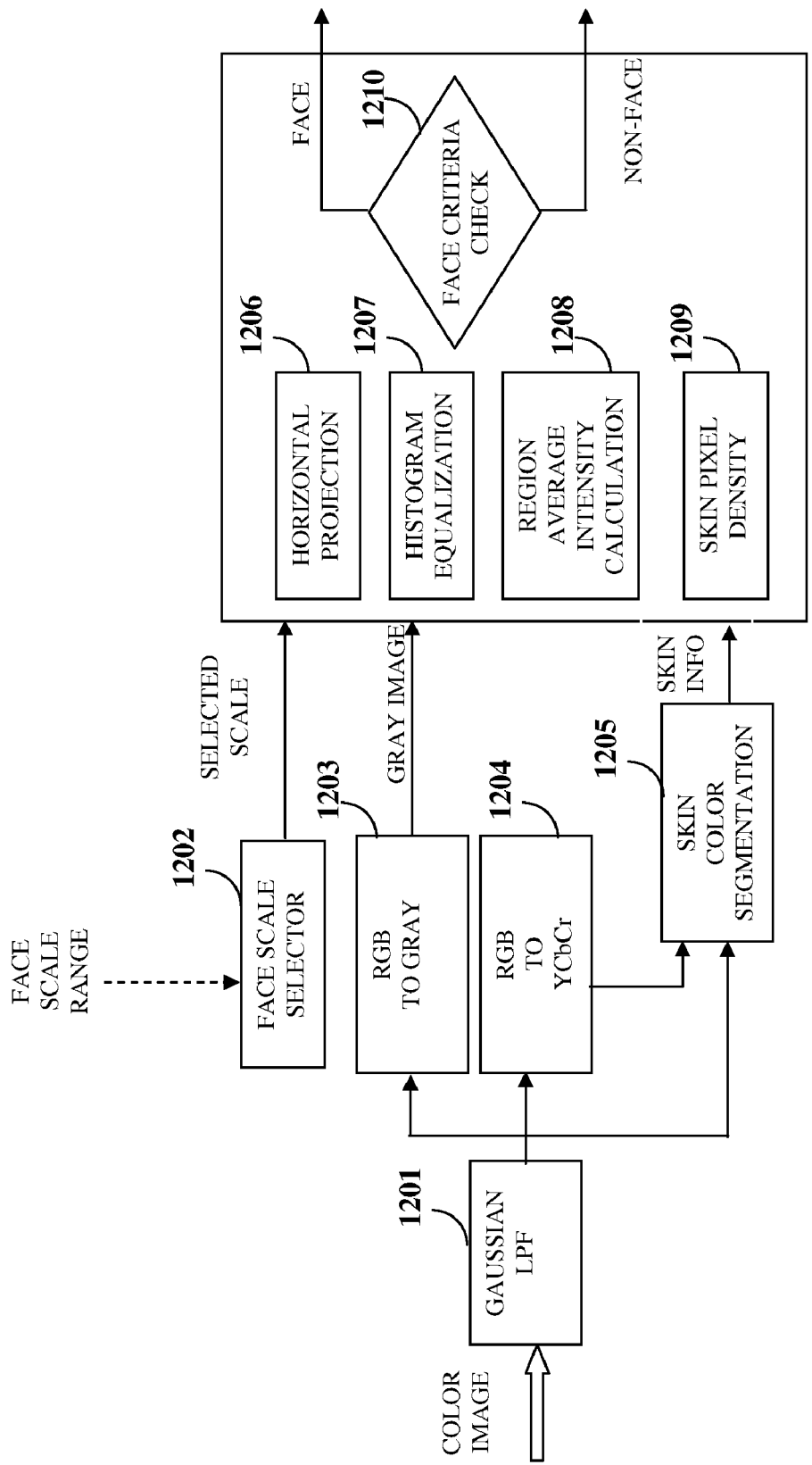
FIG. 12 exemplarily illustrates a block diagram for the template matching algorithm.

FIG. 12 exemplarily illustrates a block diagram for the template matching algorithm employed in the second layer 1002 disclosed in the detailed description of FIG. 10. After identifying the interest sub images by passing the sub images through the skin pixel segmentation layer 1001, the interest sub images are matched with a predefined template for further filtering the interest sub images. The predefined template is, for example, a face template representing a simple mask of six rectangles that depict a face. The processing at this second layer 1002 is carried out on gray scale images. The still color image is passed through a Gaussian low pass filter (LPF) 1201 before converting the still image in RGB color model to a gray scale image at block 1203. A face scale selector 1202 selects the different predefined face scale ranges to search the image for faces at different scales. The skin color segmentation block 1205 is included in template matching for convenience, and uses the still image in both RGB and YCbCr color spaces to derive skin pixel information. The RGB components of the still image are also transformed to YCbCr components at block 1204.

Based on experimental observation, it has been found that the eye regions of the face sub images have a lower gray level intensity compared to the nose and cheek regions of the face sub images. This knowledge is used in the template matching algorithm to detect eyes, nose and cheek regions of the face sub images. These face regions are represented as average intensities and used is features by the second layer 1002. These features are invariant under changes in illumination and to a certain degree of pose of the face. These features are enhanced by subjecting the sub images to histogram equalization at block 1207 and smoothing, which are the preprocessing steps employed by the template matching algorithm.

The template matching layer 1002 makes a few assumptions for filtering the face sub images. For a sub image to be declared a face, the face must be completely contained within a square or rectangular box or region of appropriate size. The box is considered to encompass a face if the sub image begins with the lower portion of the forehead and ends under the lower lip of the face, as exemplarily illustrated in FIG. 13B. Also, both the eyes have to be encompassed within the sub image. Since a face can be present in any size within the still image, the search is conducted at different scales or sub image sizes starting from a predetermined minimum size.

Figure 13A:
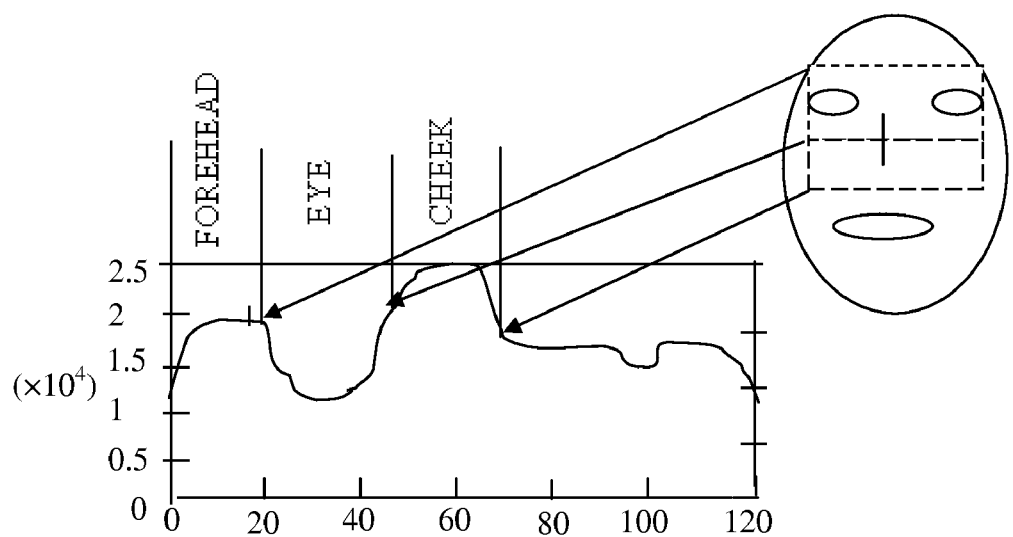
FIG. 13A exemplarily illustrates a horizontal projection graph of a face sub image.

After the pre-processing steps, the exact location of the eyes and cheeks are computed using the horizontal gray level projection of the sub images. FIG. 13A exemplarily illustrates a horizontal projection graph of a face sub image obtained at block 1206. The first peak in FIG. 13A corresponds to the forehead and the second peak corresponds to the cheek regions of the face, while the valley between the two peaks correspond to the eyes. The peaks and the valley in the horizontal projection represent the vertical positions of the forehead, eyes and cheek on the face sub-image. The location of the nose is assumed to fall at the center of the sub image. The extremities of the sub image are omitted as they do not present any information of interest. These regions are represented by the face mask as exemplarily illustrated in FIG. 13B.

Figure 14A:
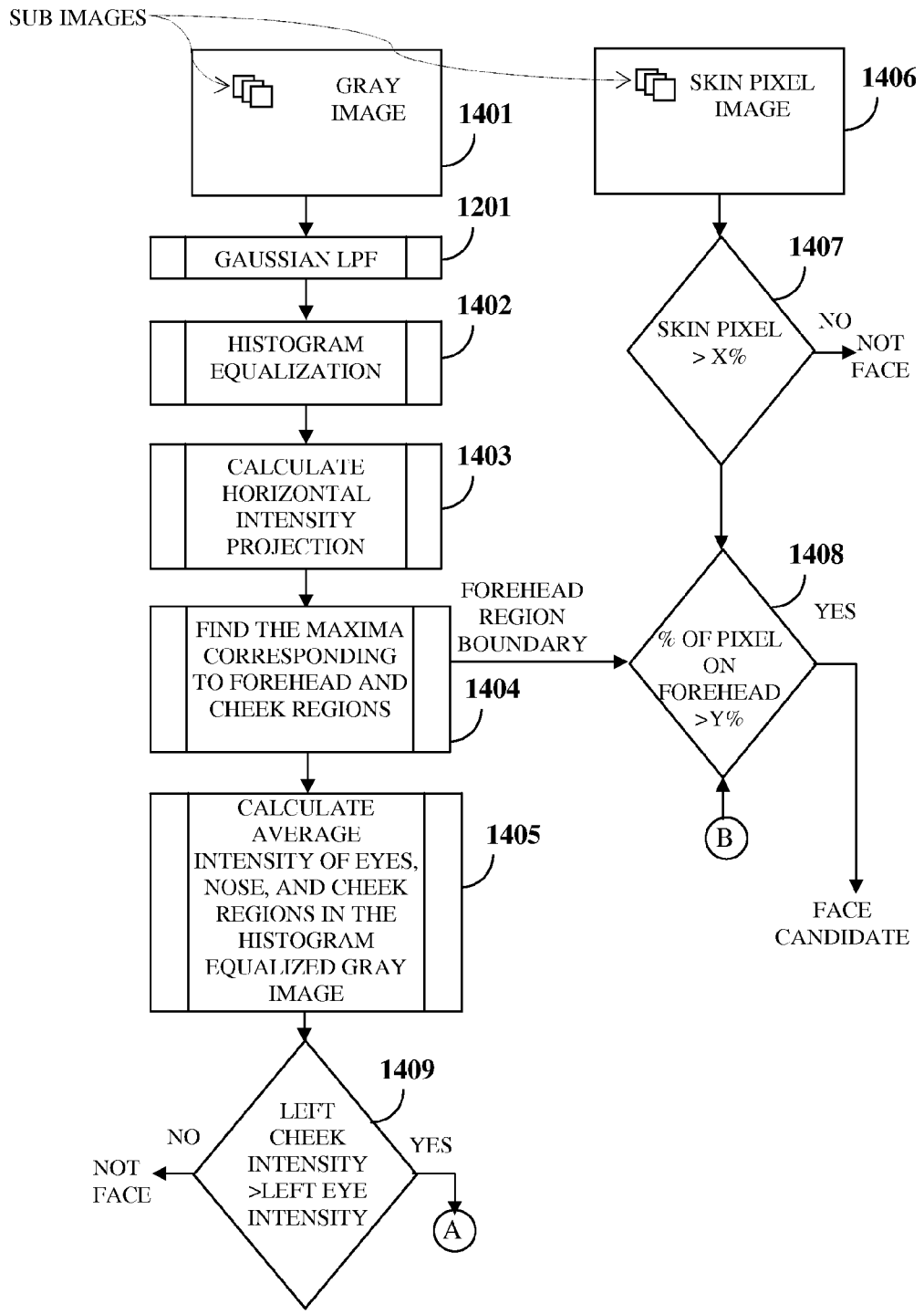
FIGS. 14A-14B exemplarily illustrate a flow chart for the template matching algorithm.
Figure 14B:
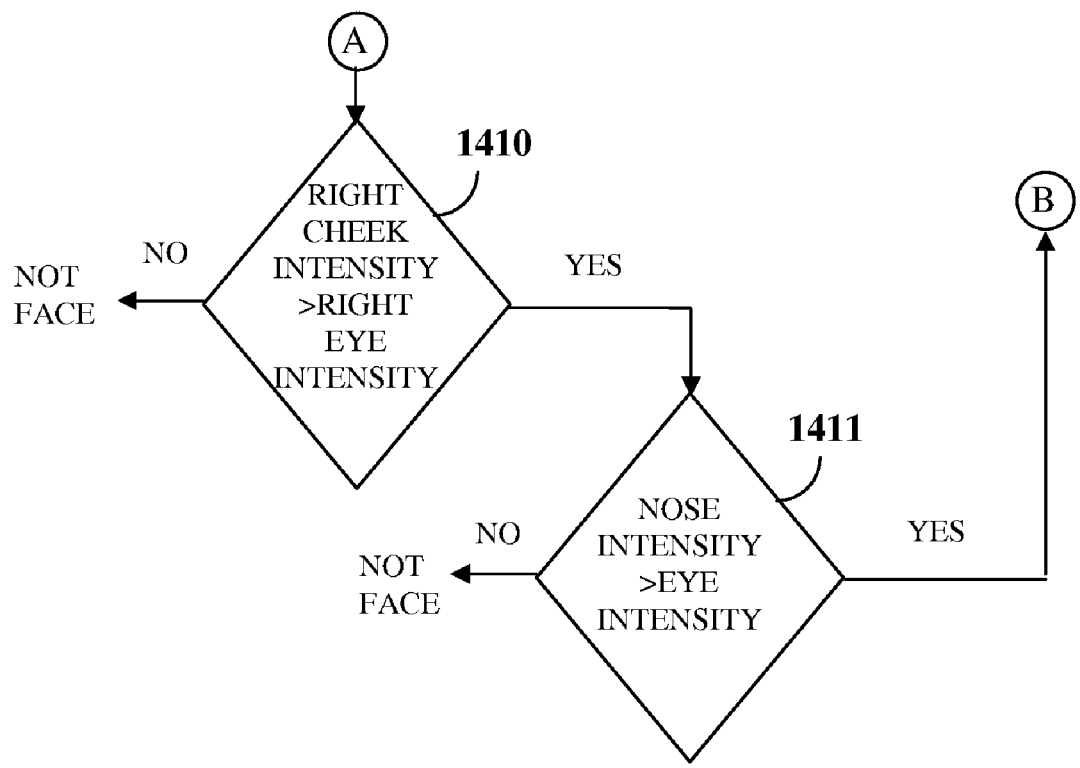

FIGS. 14A-14B illustrate a flow chart for the template matching algorithm. The gray scale sub images 1401 are passed though a Gaussian LPF 1201 and subjected to histogram equalization 1402 using block 1207 illustrated in FIG. 12. By calculating the horizontal intensity projection 1403 of the face sub images, the maxima or peaks corresponding the forehead and cheek regions are identified 1404. The maxima corresponding to the forehead is mapped to the boundary of the forehead region. The average intensity of each of the regions is calculated 1405 at block 1208, illustrated in FIG. 12, from the histogram equalized gray image. The density of skin pixels in each sub image is determined from the skin color segmented image 1406 using block 1209 illustrated in FIG. 12. A few simple heuristics are applied at block 1210 to filter face sub images. The density of skin pixels within the sub image should be greater than or equal 1407 to a predefined percentage (X %) of the sub image area. The density of skin pixels of the forehead region should be greater than or equal to 1408 a predefined threshold (Y %). The average intensity of the left eye should be lesser than 1409 the average intensity of the left cheek. The average intensity of the right eye should be lesser than 1410 the average intensity of the right cheek. The average intensity of the nose region should be greater than 1411 the average intensities of both the eyes. These rules employed by the template matching layer 1002 filter out more than 90% of the non face sub images.

After the filtering at the second layer 1002, the face tilt is estimated and compensated at the third layer 1003. Since there is rarely a sub image in which a person's face is perfectly upright, some amount of tilt and pose variations are expected in most sub images. The computer implemented method is resilient to these use cases. The tilt estimation and correction module 802g, as disclosed in the detailed description of FIG. 8, is employed to detect face tilt and compensate for the face tilt.

Figure 13B:
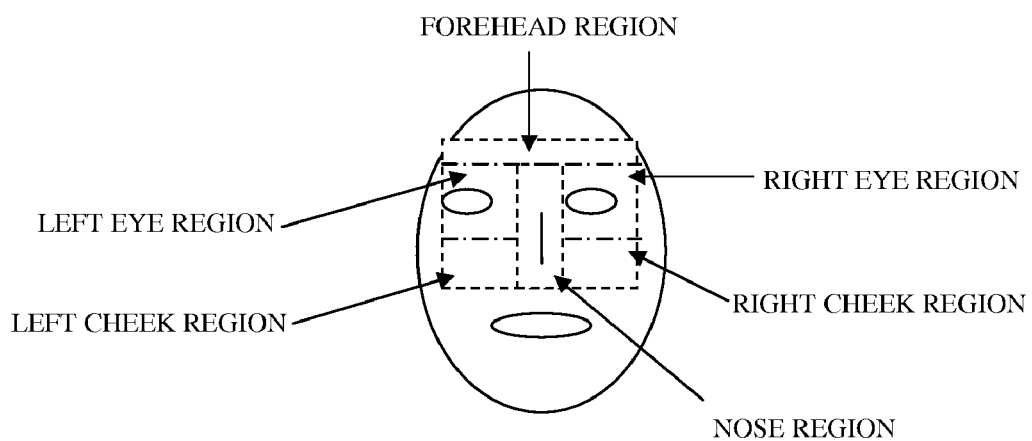
FIG. 13B exemplarily illustrates a face mask demarcating predefined regions of a face.
Figure 15A:
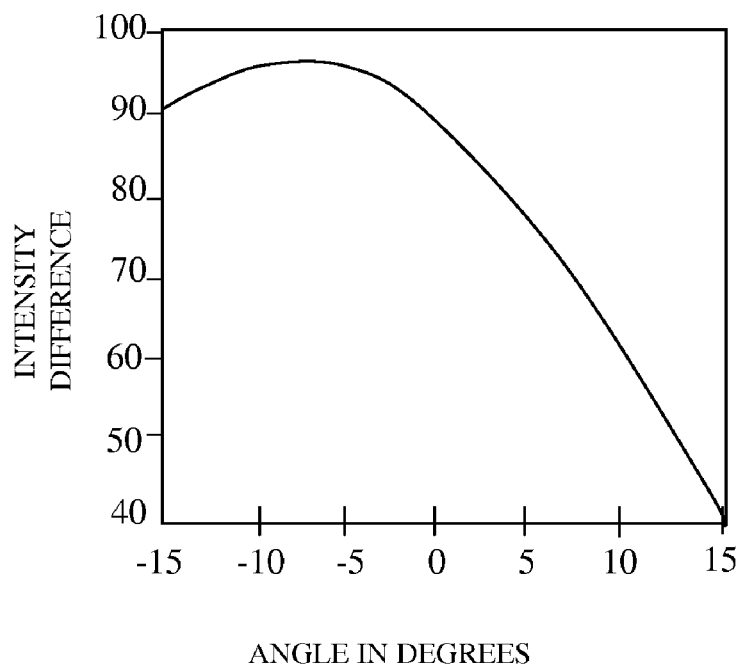
FIG. 15A exemplarily illustrates a graph of the intensity differences between two regions at different rotation angles.
Figure 15B:
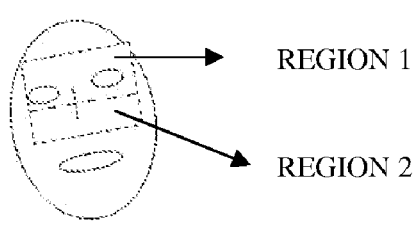
FIG. 15B exemplarily illustrates a tilted face sub image.

Referring to FIG. 13B, the eye and cheek regions are detected and represented as two rectangles. If the face is tilted, as illustrated in FIG. 15B, the difference in the average intensities between the rectangular portions of the cheek region and the eye region is at a maximum at the compensation angle of the tilt. FIG. 15A exemplarily illustrates a graph of the intensity differences between two regions at different rotation angles. The third layer 1003 is an optional layer employed to present uniform aligned faces to the subsequent layers.

Figure 15C:
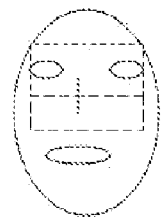
FIG. 15C exemplarily illustrates a tilt corrected face sub image.
Figure 16:
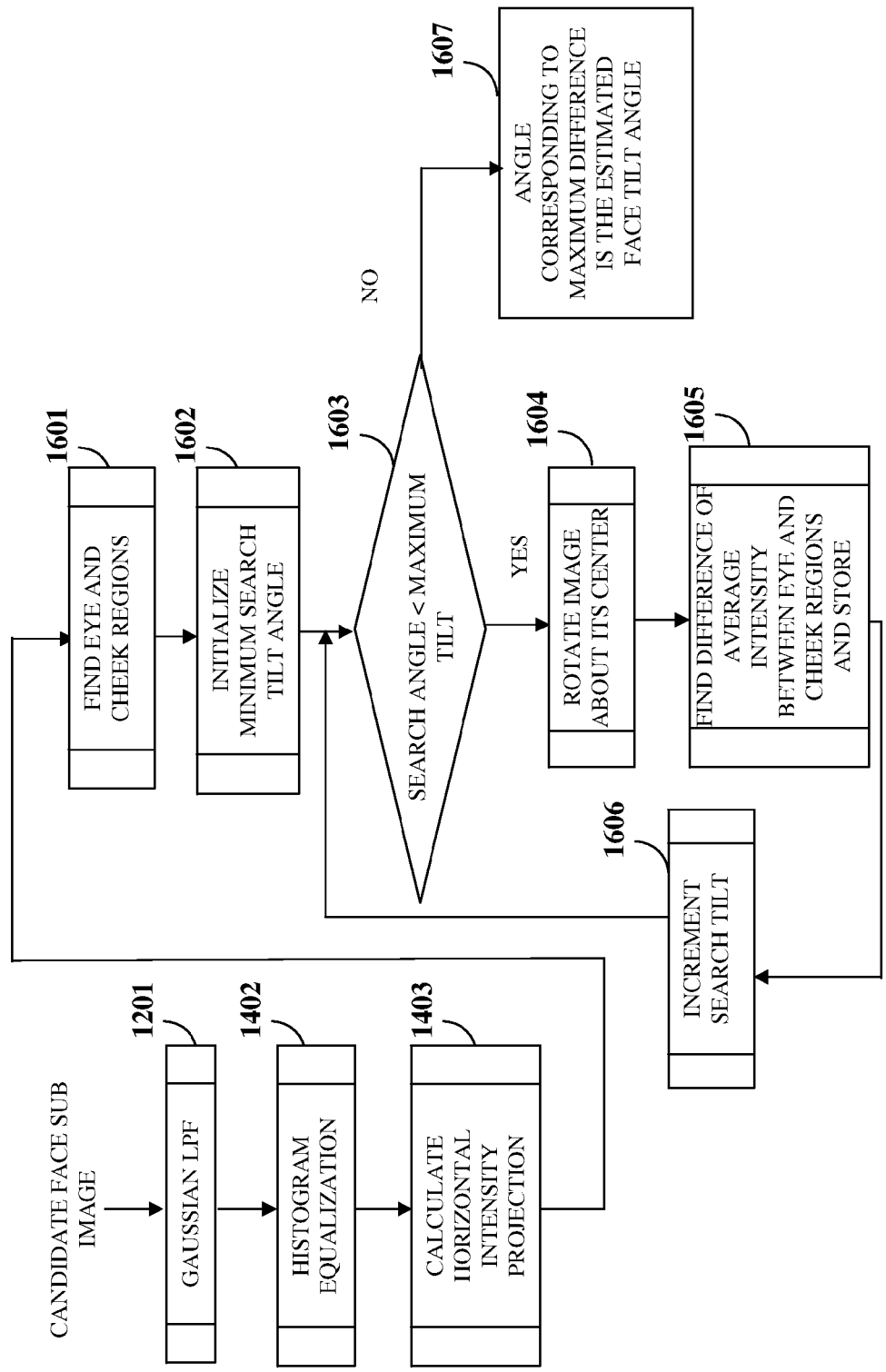
FIG. 16 exemplarily illustrates a process flow diagram for tilt estimation and correction.

FIG. 16 exemplarily illustrates a process flow diagram for tilt estimation and correction. After performing the steps 1201, 1402, and 1403 as disclosed in the detailed description of FIG. 14, the locations of the eye and cheek regions are determined 1601. Each filtered interest sub image is rotated in incremental degrees for searching the compensation angle for the tilt in the sub image. The search is initialized 1602 with the minimum search tilt angle for the filtered interest sub image. After introducing each incremental search tilt 1606 to the filtered interest sub image, the search tilt angle is compared with 1603 a predefined maximum tilt in order to keep the search tilt angle within a certain limit. Also, after each incremental rotation 1604 of the filtered interest sub image, the difference between the average intensities of the eye and cheek regions is determined and stored 1605. The estimated tilt angle, or the compensation angle is the search tilt angle 1607 that corresponds to the maximum difference between the average intensities of the eye and cheek regions. The compensation angle is introduced to each of the filtered interest sub images to obtain the tilt corrected sub images, as illustrated in FIG. 15C. This layer 1003 also helps eliminate a few false positives from the preceding layers 1001 and 1002 based on the predefined maximum tilt. The search for the compensation angle for the tilt, that is, the search tilt angle that corresponds to the maximum difference between the average intensities of the eye and cheek regions can be optimized using, for example, a golden section search method and other unimodal optimization techniques. Generally, the golden section search finds the minimum or maximum of a unimodal function by successively narrowing the range of values inside which the minimum or maximum is known to exist. The golden section search method finds the search tilt angle that corresponds to the maximum difference between the average intensities of the eye and cheek regions, by successively narrowing the range of search tilt angles inside which the maximum difference of the average intensities is known to exist.

The fourth layer 1004 carried out by the feature analyses module 802c disclosed in the detailed description of FIG. 8, involves gabor feature extraction for determining prospective face sections and prospective near face sections, and boosted classification for classifying the prospective face sections and near face sections into face and non face sections. Gabor features of tilt compensated sub images are obtained by filtering the sub images by using a 2 dimensional (2-D) gabor feature filter 802f whose impulse response is defined by a 2-D harmonic function multiplied with a Gaussian function. The gabor feature filter 802f is defined by the following equation:

$$\psi(x, y, \omega_o, \theta) = \frac{\omega_o}{\sqrt{2\pi}\,\kappa} e^{-\frac{\omega_o^2}{8\kappa^2}(4(x\cos\theta + y\sin\theta)^2 + (-x\sin\theta + y\cos\theta)^2)}$$

where x, y are the coordinates of the image, $\omega_0$ is the frequency of the harmonic, $\theta$ is angular orientation of the gabor feature filter 802f, and K controls the spread of the Gaussian kernel.

Figure 17:
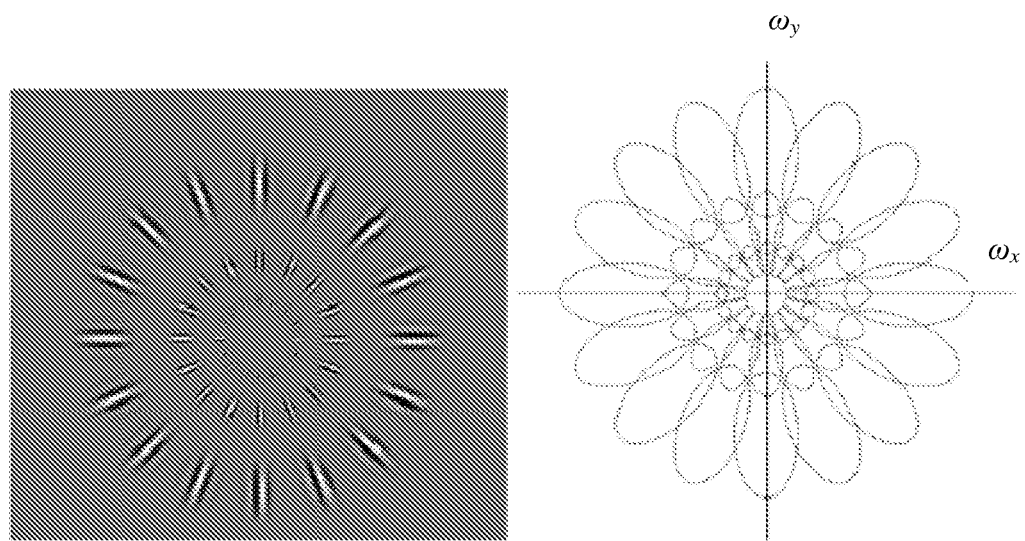
FIG. 17 exemplarily illustrates an ensemble of gabor wavelets with 1.5 octave bandwidth, and their coverage of the spatial frequency plane.
Figure 18:
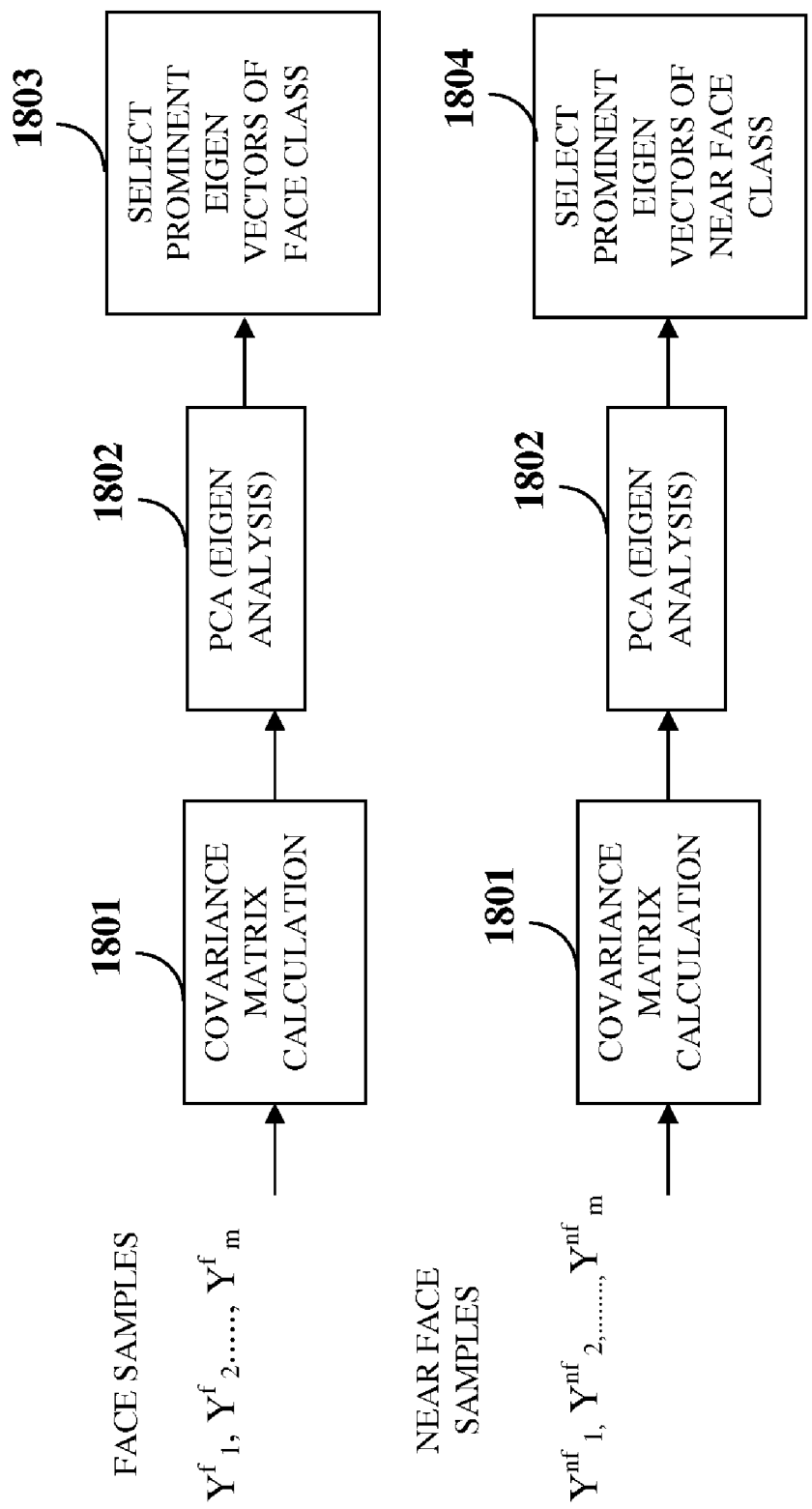
FIG. 18 illustrates a block diagram for obtaining prominent eigen vectors for a face class and a near face class.

FIG. 17 exemplarily illustrates an ensemble of gabor wavelets with 1.5 octave bandwidth, and their coverage of the spatial frequency plane. Each ellipse shows the half-amplitude bandwidth contour dilated by a factor of 2, covering almost the support of a wavelet. In the computer implemented system disclosed herein, the resolution of the still image is set at n×n. The parameters $\omega_0$, $\theta$ and $\kappa$ are empirically set to the following values: $\kappa=\pi$, $f=0.5\pi/\sqrt{2}$; $\omega_0=2\pi f$; and $\theta=\pi/2$, though the values of the parameters can be varied based on the resolution. The 2-D filter coefficients generated are complex and the imaginary terms of the gabor feature filter 802f are used as the final filter coefficients. The gabor wavelet features capture the gradient information within the still image along a particular orientation and frequency. As used herein, the orientation and frequency are specified by the parameters $\theta$ and $\omega_0$ respectively. FIG. 18 illustrates a block diagram for obtaining prominent eigen vectors for a face class and a near face class. Training samples are collected for the face class and the near face class. Gabor features are computed for each sample. Eigen vectors are computed for both face and near face batches. Principal component analysis (PCA) 1802 by covariance matrix calculation 1801 is used to transform the large number of samples to smaller number of eigen vectors for face and near face classes. The prominent eigen vectors of the face class and the near face class are selected 1803 and 1804 and retained.

Figure 19:
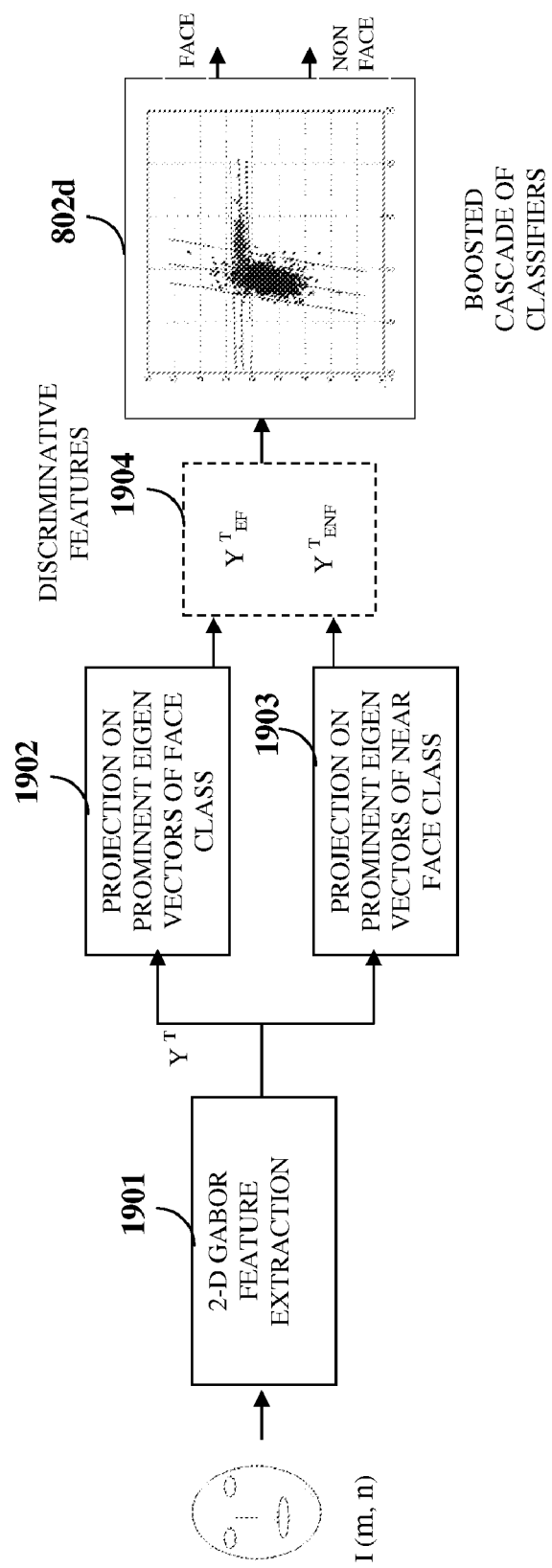
FIG. 19 exemplarily illustrates a block diagram for classifying face and non face classes using prominent eigen vectors of each class.

The features extracted using 2-D gabor feature extraction 1901, as disclosed in the detailed description of FIG. 17 and FIG. 18, are projected on to the prominent eigen vectors of the face class 1902 and the near face class 1903, as exemplarily illustrated in the block diagram of FIG. 19. As used herein, "projection" refers to the dot product of each of two vectors X and Y of the same length, given by $X*Y^T$. A boosted cascade of classifiers 802d is trained to separate these feature vectors of the discriminative features 1904 as either face or a non face. The boosted cascade of classifiers 802d comprises a boosting algorithm for iteratively learning weak classifiers to become a strong classifier. As used herein, "feature vector" for the discriminative features is based on a series of measurements made on a sub image and represented as a set of numbers. The length of the feature vector is equal to the number of measurements.

The fifth and final layer 1005 in the example disclosed herein involves SVM classification using grayscale features. SVM refers to methods for supervised learning. In the case of two class problems such as face detection, SVM training constructs a set of multidimensional hyper planes that separate the data as face and non face. The hyper planes are constructed such that they have the maximal separation between outliers of the two classes. SVMs are capable of learning in high dimensional space with a relatively small number of samples.

Figure 20:
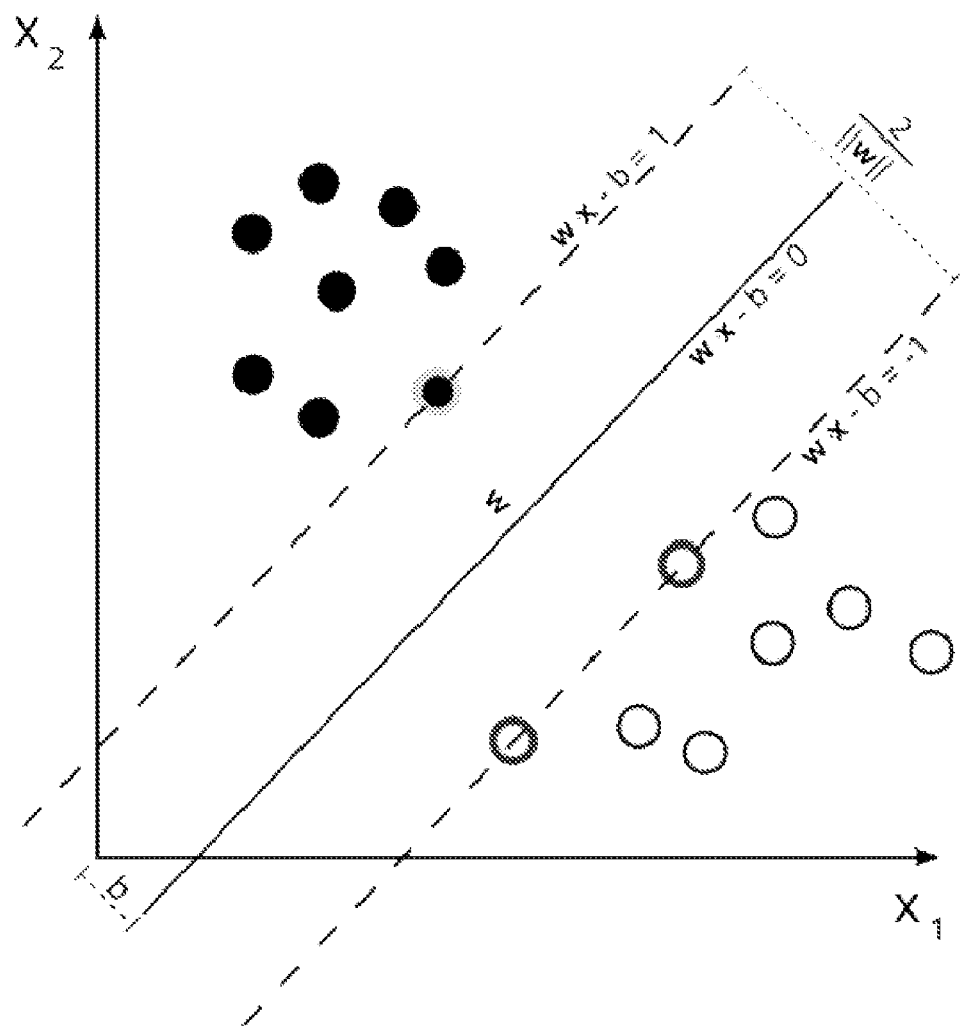
FIG. 20 illustrates a typical maximum-margin hyper plane and margins for a support vector machine trained with samples from two classes.

FIG. 20 illustrates a typical maximum-margin hyper plane and margins for a SVM trained with samples from two classes. In case the data cannot be separated by hyper planes, a kernel function is used that warps the space of the data points such that the hyper planes can separate data in the warped space.

Figure 21:
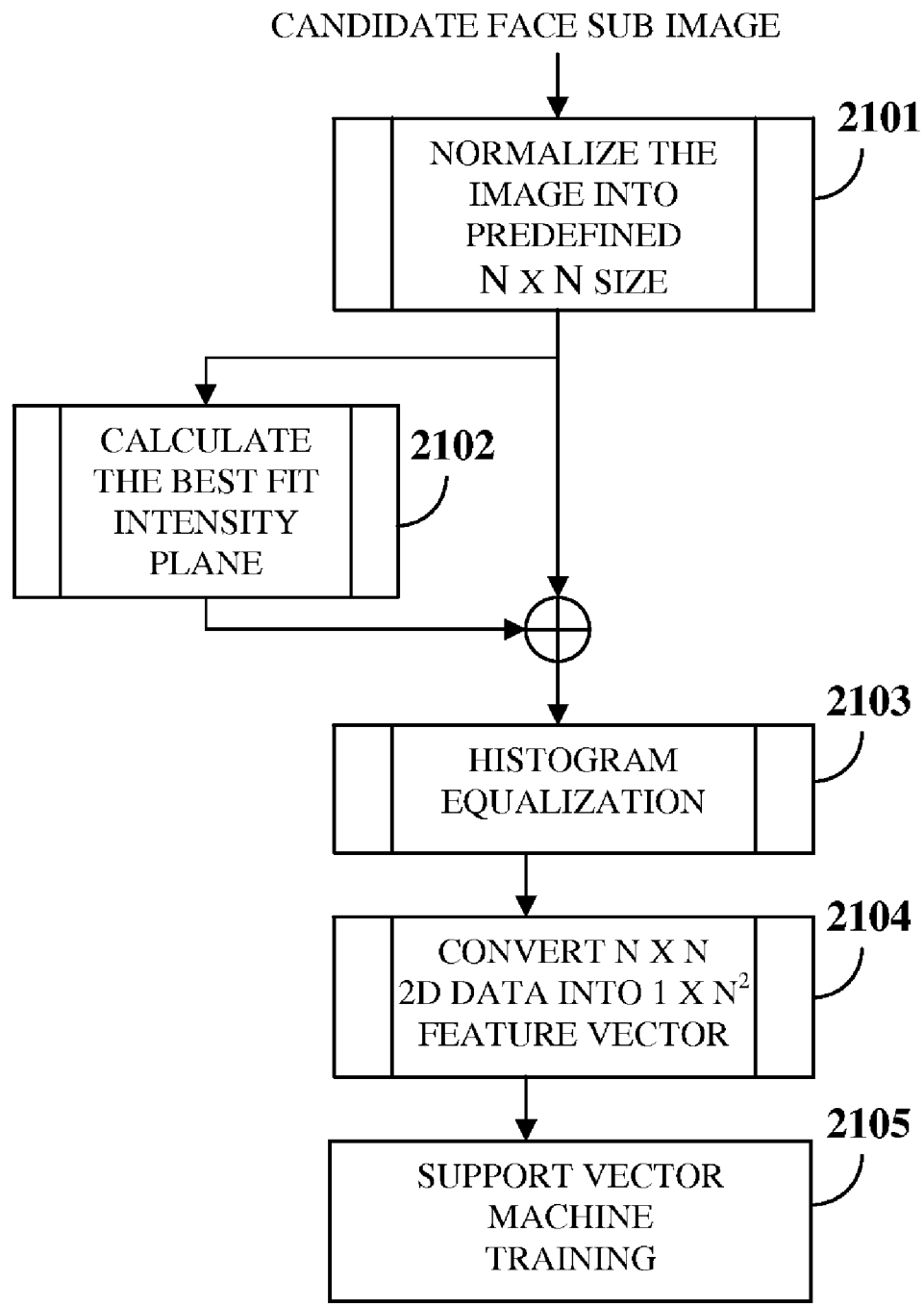
FIG. 21 exemplarily illustrates a process flow diagram of the preprocessing steps for training support vector machines.

FIG. 21 exemplarily illustrates a process flow diagram of the preprocessing steps for training SVMs. SVMs are trained on the grayscale intensity images with the preprocessing steps shown in FIG. 21. The filtered face sub images are resized and normalized 2101 to a predetermined N×N dimension. An algorithm is employed for fitting a least squares intensity plane 2102 to the data points of the filtered face sub images being analyzed. The filtered face sub images are subjected to histogram equalization 2103 for contrast enhancement. The N×N, 2 dimensional data of the filtered face sub images is converted 2104 into a $1 \times N^2$ feature vector. Hand labeled images of the two classes being subjected to the preprocessing described in FIG. 21 are used to train 2105 a SVM classifier 802e. A polynomial kernel function of degree 3 or higher is best suited for the classification problem being dealt with in the present example. The sub images filtered as face by the first four layers 1001, 1002, 1003, and 1004 are subjected to SVM classification. Though the computational complexity of this layer 1005 is high, the SVM classifier 802e is used to confirm existence of a face in less than 0.5% of the image area.

Consider an example for detecting face sections in a still image, where a sample of 150 test images are obtained from a color face recognition technology (FERET) database and processed using the computer implemented method and system disclosed herein to demonstrate a face detection rate of about 95%, a false positive rate of 3%, and a false negative rate of 5%. Each of the 150 images is a color image containing portraits of individuals. The test data accounted for images of individuals of different gender, race and different facial expressions. The images were carefully selected such that the images also included faces with glasses, beards, and mustaches. The images obtained for training the boosted cascade of classifiers 802d and the SVM classifier 802e at the fourth and fifth layers 1004 and 1005 had 2900 faces. An equal number of near face sections were also collected by running the algorithms up to the third layer 1003 on a set of images collected on a campus and from the internet. FIGS. 22A-22B exemplarily illustrate an output of the interest section detector 802 for a sample input still image. The input image is analyzed by employing observation windows or sub images at all possible sub-sections and scales, and these sub images are filtered through the stages described in the detailed description of FIG. 10 to obtain one or more sub images containing face sections.

FIG. 22C exemplarily tabulates the layer-wise non face rejection capabilities with a sample input image. Layers 1 and 2 1001 and 1002 combined reject over 95% of the non face candidates in the search space and represent the layers of the lowest complexity in the computer implemented method disclosed herein. Layer 3 1003 makes a minimal contribution to the detection. Layer 4 1004 rejects, for example, another 3.7% of the search space, while the most computationally intensive SVM classification layer 1005 is called upon to analyze the remaining 0.23% of the search space.

It will be readily apparent that the various methods and algorithms described herein may be implemented in a computer readable medium appropriately programmed for general purpose computers and computing devices. Typically a processor, for example, one or more microprocessors will receive instructions from a memory or like device, and execute those instructions, thereby performing one or more processes defined by those instructions. Further, programs that implement such methods and algorithms may be stored and transmitted using a variety of media, for example, computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, central processing unit (CPU) devices, computing devices, microcontrollers, digital signal processors or like devices. The term "computer readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include dynamic random access memory (DRAM), which typically constitutes the main memory. Transmission media include coaxial cables, copper wire and fiber optics, including the wires that comprise a system bus coupled to the processor. Common forms of computer readable media include, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, a carrier wave as described hereinafter, or any other medium from which a computer can read. In general, the computer readable programs may be implemented in any programming language. Some examples of languages that can be used include C, C++, C#, or JAVA. The software programs may be stored on or in one or more mediums as an object code. A computer program product comprising computer executable instructions embodied in a computer readable medium comprises computer parsable codes for the implementation of the processes of various embodiments.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, UltraSPARC® processors, Sun® processors, IBM® processors, etc. that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A computer implemented method for detecting interest sections in a still image, comprising:
    segmenting one or more sub images of said still image based on pixels of interest in one or more color spaces, said one or more sub images being categorized into one or more of interest sub images and a plurality of non interest sub images based on said segmentation;
    matching one of a gray scale version of said interest sub images and a binary image version of said interest sub images with a predefined template for filtering said interest sub images based on relative densities of said pixels of interest and relative average intensities of predetermined features in said interest sub images;
    determining a plurality of prospective image sections comprising one or more of a plurality of prospective interest sections and a plurality of prospective near interest sections by performing discriminative feature analyses of said filtered interest sub images, wherein said discriminative feature analyses are processed by a boosted cascade of classifiers; and
    detecting said interest sections in said still image from said prospective interest sections and said prospective near interest sections by said boosted cascade of classifiers.

2. The computer implemented method of claim 1, wherein said discriminative feature analyses of said filtered interest sub images are performed using a gabor feature filter, wherein said discriminative feature analyses of said filtered interest sub images comprises:
    resizing and normalizing said filtered interest sub images to a predetermined dimension;
    subjecting said resized interest sub images to a gabor feature transform by passing said resized interest sub images through said gabor feature filter for obtaining first feature vectors corresponding to said prospective interest sections and said prospective near interest sections;
    subjecting said obtained first feature vectors to a principal component analysis for obtaining two sets of prominent eigen vectors;
    projecting said obtained first feature vectors on said prominent eigen vectors for obtaining final feature vectors; and
    classifying said final feature vectors using one or more of said boosted cascade of classifiers for obtaining said interest sections and non interest sections.

3. The computer implemented method of claim 1, further comprising subjecting said detected interest sections to a support vector machine classifier, if said boosted cascade of classifiers detects at least one of said interest sections in said still image.

4. The computer implemented method of claim 3, wherein subjecting said detected interest sections to said support vector machine classifier comprises:
    resizing and normalizing said detected interest sections to a predetermined dimension;
    compensating brightness variations on said resized interest sections using a least squares fit plane;
    performing histogram equalization for said compensated interest sections for adjusting contrast of grayscale versions of said compensated interest sections;
    training said support vector machine classifier with labeled training samples as data points; and
    subjecting said histogram equalized interest sections as data points to said support vector machine classifier for further detecting interest sections.

5. The computer implemented method of claim 1, further comprising estimating a tilt in each of said filtered interest sub images and correcting said estimated tilt based on said relative average intensities of said predetermined features in said filtered interest sub images for obtaining a plurality of corrected interest sub images.

6. The computer implemented method of claim 5, wherein said estimation and correction of said tilt in each of said filtered interest sub images comprises:
    performing histogram equalization for said filtered interest sub images using a plurality of image histograms for adjusting contrast of said filtered interest sub images;
    computing a horizontal intensity projection for said filtered interest sub images;
    identifying locations of said predetermined features in said filtered interest sub images relative to one another using said horizontal intensity projection;
    measuring average intensities on said filtered interest sub images;
    comparing said average intensities corresponding to said predetermined features in said filtered interest sub images at different predefined tilt angles, wherein a maximum relative average intensity of two or more of said predetermined features corresponds to a compensation tilt in each of said filtered interest sub images; and correcting said tilt by introducing said compensation tilt in each of said filtered interest sub images for obtaining said corrected interest sub images.

7. The computer implemented method of claim 1, further comprising obtaining said binary image version of said interest sub images from said still image, comprising:

analyzing said still image in one or more color spaces, comprising:

comparing each color component of each of a plurality of pixels in said still image with a threshold value for said color component based on predetermined criteria;

determining at least one of a plurality of pixels of interest and a plurality of pixels of non interest from among said pixels based on said comparison; and obtaining said binary image version of said interest sub images comprising said determined pixels of interest based on said analysis of said still image.

8. The computer implemented method of claim 7, wherein said predetermined criteria for said comparison comprise a range of potential color tones of said prospective interest sections in said interest sub images and contrast quality of said still image.

9. The computer implemented method of claim 1, wherein said matching of said gray scale version of said interest sub images with said predefined template comprises:

obtaining a horizontal projection of intensities of a plurality of gray pixels in said gray scale version of said interest sub images;

measuring average intensities of said predetermined features in said interest sub images based on measurements from said horizontal projection; and comparing said average intensities corresponding to said predetermined features in said interest sub images for mapping locations of said predetermined features relative to one another.

10. The computer implemented method of claim 1, wherein said boosted cascade of classifiers comprises one or more linear classifiers.

11. The computer implemented method of claim 1, wherein said pixels of interest are skin pixels.

12. The computer implemented method of claim 1, wherein said predetermined features in said interest sub images comprise eyes, nose, and cheek regions of a face.

13. The computer implemented method of claim 1, wherein said prospective interest sections are prospective face sections, and said prospective near interest sections are prospective near face sections.

14. The computer implemented method of claim 1, further comprising gabor feature extraction for training one or more of said boosted cascade of classifiers for determining a plurality of prospective image sections, comprising:

resizing and normalizing said filtered interest sub images to a predetermined dimension;

subjecting said resized interest sub images to a gabor feature transform by passing said resized interest sub images through a gabor feature filter for obtaining first feature vectors corresponding to said prospective interest sections and said prospective near interest sections;

obtaining a predetermined number of training samples from said first feature vectors corresponding to said prospective interest sections and said prospective near interest sections;

subjecting said training samples corresponding to said prospective interest sections and said prospective near interest sections to a principal component analysis for obtaining two sets of prominent eigen vectors;

projecting said training samples on said obtained prominent eigen vectors for obtaining gabor discriminative features; and training said one or more of said boosted cascade of classifiers to recognize said interest sections and said non interest sections from said gabor discriminative features.

15. The computer implemented method of claim 14, wherein said two sets of prominent eigen vectors correspond to prominent eigen vectors of a face class and a near face class.

16. The computer implemented method of claim 14, wherein said interest sections correspond to face sections, and said non interest sections correspond to non face sections.

17. A computer implemented system for detecting interest sections in a still image, comprising:

an image segmentation module that segments one or more sub images of said still image based on pixels of interest in one or more color spaces, said one or more sub images being categorized into one or more of interest sub images and a plurality of non interest sub images based on said segmentation;

a template matching engine that matches one of a gray scale version of said interest sub images and a binary image version of said interest sub images with a predefined template for filtering said interest sub images based on relative densities of said pixels of interest and relative average intensities of predetermined features in said interest sub images;

a feature analyses module that determines a plurality of prospective image sections comprising one or more of a plurality of prospective interest sections and a plurality of prospective near interest sections by performing discriminative feature analyses of said filtered interest sub images using a gabor feature filter; and a boosted cascade of classifiers that detects said interest sections in said still image from said prospective interest sections and prospective near interest sections.

18. The computer implemented system of claim 17, further comprising a support vector machine classifier that further detects interest sections in said still image, if said boosted cascade of classifiers detects at least one of said interest sections in said still image.

19. The computer implemented system of claim 17, further comprising a tilt estimation and correction module that estimates a tilt in each of said filtered interest sub images and corrects said estimated tilt based on said relative average intensities of said predetermined features in said filtered interest sub images for obtaining a plurality of corrected interest sub images.

20. The computer implemented system of claim 17, wherein said boosted cascade of classifiers comprises one or more linear classifiers.

21. The computer implemented system of claim 17, wherein said pixels of interest are skin pixels.

22. The computer implemented system of claim 17, wherein said predetermined features in said interest sub images comprise eyes, nose, and cheek regions of a face.

23. A computer program product comprising computer executable instructions embodied in a non-transitory computer readable storage medium, wherein said computer program product comprises:

a first computer parsable program code for segmenting one or more sub images of said still image based on pixels of interest in one or more color spaces, said one or more sub images being categorized into one or more of interest sub images and a plurality of non interest sub images based on said segmentation;

a second computer parsable program code for matching one of a gray scale version of said interest sub images and a binary image version of said interest sub images with a predefined template for filtering said interest sub images based on relative densities of said pixels of interest and relative average intensities of predetermined features in said interest sub images;

a third computer parsable program code for determining a plurality of prospective image sections comprising one or more of a plurality of prospective interest sections and a plurality of prospective near interest sections by performing discriminative feature analyses of said filtered interest sub images using a gabor feature filter, wherein said discriminative feature analyses are processed by a boosted cascade of classifiers; and a fourth computer parsable program code for detecting interest sections in said still image from said prospective interest sections and said prospective near interest sections by said boosted cascade of classifiers.

24. The computer program product of claim 23, further comprising a fifth computer parsable program code for subjecting said detected interest sections to a support vector machine classifier, if said boosted cascade of classifiers detects at least one of said interest sections in said still image.

25. The computer program product of claim 23, further comprising a sixth computer parsable program code for estimating a tilt in each of said filtered interest sub images and correcting said estimated tilt based on said relative average intensities of said predetermined features in said filtered interest sub images for obtaining a plurality of corrected interest sub images.

* * * * *